United States Patent
Inayama et al.

(10) Patent No.: US 9,284,927 B2
(45) Date of Patent: Mar. 15, 2016

(54) MOTORCYCLE WITH TURBOCHARGER

(71) Applicant: SUZUKI MOTOR CORPORATION, Hamamatsu-shi, Shizuoka (JP)

(72) Inventors: Yoshisato Inayama, Hamamatsu (JP); Shinya Otani, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 14/506,755

(22) Filed: Oct. 6, 2014

(65) Prior Publication Data
US 2015/0101875 A1 Apr. 16, 2015

(30) Foreign Application Priority Data

Oct. 16, 2013 (JP) .................. 2013-215690
Oct. 22, 2013 (JP) .................. 2013-219526
Oct. 25, 2013 (JP) .................. 2013-222475

(51) Int. Cl.
| | |
|---|---|
| *B60K 13/02* | (2006.01) |
| *F02M 35/16* | (2006.01) |
| *B62K 11/04* | (2006.01) |
| *F02B 37/18* | (2006.01) |
| *F02M 35/04* | (2006.01) |
| *F02M 35/10* | (2006.01) |
| *F02B 37/16* | (2006.01) |

(52) U.S. Cl.
CPC .............. *F02M 35/162* (2013.01); *B60K 13/02* (2013.01); *B62K 11/04* (2013.01); *F02B 37/16* (2013.01); *F02B 37/18* (2013.01); *F02B 37/183* (2013.01); *F02M 35/048* (2013.01); *F02M 35/10157* (2013.01)

(58) Field of Classification Search
CPC ........ B60K 13/00; B60K 13/02; B62K 11/04; F02M 35/162
See application file for complete search history.

(56) References Cited

U.S. PATENT DOCUMENTS

| | | | | |
|---|---|---|---|---|
| 5,586,540 | A * | 12/1996 | Marzec et al. ............. | 123/559.1 |
| 2012/0267182 | A1* | 10/2012 | Saeki et al. .................... | 180/219 |
| 2015/0083513 | A1* | 3/2015 | Ito et al. ........................ | 180/229 |
| 2015/0107923 | A1* | 4/2015 | Inayama ....................... | 180/229 |

FOREIGN PATENT DOCUMENTS

| | | |
|---|---|---|
| EP | 2 075 181 | 7/2009 |
| JP | S60-240524 | 11/1985 |
| JP | 2009-173259 | 8/2009 |
| WO | 2005111395 A2 | 11/2005 |

OTHER PUBLICATIONS

German Office Action dated Jul. 13, 2015 issued in corresponding German Patent Application No. 102014115078.3.

* cited by examiner

*Primary Examiner* — Kevin Hurley
(74) *Attorney, Agent, or Firm* — Troutman Sanders LLP

(57) ABSTRACT

An engine; an air cleaner which filtrates fuel air; a turbocharger which compresses intake fuel air; an intake pipe which connects the air cleaner and the turbocharger; and an intake passage which induces the fuel air taken from an intake port at an end part to the air cleaner, are included. The turbocharger is located at a front side lower part of the engine, and the air cleaner is located under a crankcase. The intake passage extends rearward from a rear part of the air cleaner, and thereafter, bends upward.

18 Claims, 18 Drawing Sheets

MOTORCYCLE WITH TURBOCHARGER

CROSS-REFERENCE TO RELATED APPLICATIONS

This application is based upon and claims the benefit of priority of the prior Japanese Patent Application No. 2013-215690, filed on Oct. 16, 2013, the prior Japanese Patent Application No. 2013-219526, filed on Oct. 22, 2013, and the prior Japanese Patent Application No. 2013-222475, filed on Oct. 25, 2013, the entire contents of which are incorporated herein by reference.

BACKGROUND OF THE INVENTION

1. Field of the Invention

The present invention relates to a motorcycle with turbocharger including a turbocharger which compresses fuel air and supplies to an engine.

2. Description of the Related Art

In a vehicle such as a motorcycle, there is a case when a combination of a reduction in an engine exhaust rate and a turbocharger is used, namely, the reduction in the exhaust rate of the engine and an improvement in intake efficiency by the turbocharger are simultaneously performed to enable a fuel efficiency improvement and an output power increase of the engine being an internal combustion engine.

In case of a motorcycle mounting so-called a "turbo" which compresses intake air by using an exhaust stream, a turbocharger makes use of the exhaust stream, and therefore, it is necessary to connect to an exhaust pipe extending from a cylinder head. Besides, the turbocharger is a large-sized and heavy part, and therefore, it is desirable to dispose the turbocharger at a front and lower part of a cylinder, particularly, at a lower part of a vehicle body as much as possible as illustrated in Patent Document 1 (FIG. 5).

Besides, when a motorcycle is equipped with a turbocharger, control valves (control parts) such as a waste gate valve (WGV) and an air bypass valve (ABV) are used together. In case of the motorcycle, it is effective to dispose the turbocharger at a rear of a front wheel from a relationship of heat damage and a weight as it is disclosed in, for example, Patent Document 2. On the other hand, under a disposition relationship as stated above, it is easy to be affected by scattering stones and so on at a vehicle driving time, and therefore, it is necessary that dedicated protective parts are to be equipped, or the control parts are to be disposed at a position free from the influence so as to avoid the influence.

Further, in Patent Document 1, a turbocharger is attached at a position adjacent to a cylinder head of an engine. The turbocharger compresses outside air introduced from an air cleaner box by a compressor, and thereafter, cools by an intercooler to supply to the engine. The outside air compressed by the turbocharger is burned at the engine, and thereby, combustion efficiency is improved, and the fuel efficiency improvement and the output power increase are enabled.

[Patent Document 1] Japanese Laid-open Patent Publication No. 2009-173259

[Patent Document 2] Japanese Laid-open Patent Publication No. S60-240524

Air cleaned by an air cleaner is supplied to the turbocharger. In this case, an intake port to take the air into the air cleaner is disposed at a high position from the ground, at a rear surface of another part, or the like to prevent entering of water, mud, and so on. An air intake pipe connected to the turbocharger extends toward a front and lower part of an engine in a conventional air cleaner disposition, and an intake passage (pipe) becomes long. Besides, there are cases when an air cleaner capacity is sacrificed to set the intake port at a proper position, or a disposition is restricted resulting from a relationship with the other parts.

In particular, the control valves and so on are weak for shock caused by collision of the scattering stones and so on, therefore, the dedicated protective parts are provided as stated above, or a disposed position is devised so as to avoid the effect. However, when the dedicated parts are provided, a weight and cost increase in accordance with an increase in the number of parts. Otherwise, a connection pipe length between the turbocharger and the control valves cannot but become longer more than necessary because the turbocharger and the control valves are apart. Therefore, there are problems such that a proper control is difficult to be performed in addition to the increase in weight and cost.

Further, in the motorcycle with the turbocharger as stated above, an improvement in vehicle body stiffness is required in accordance with the improved output power. On the other hand, the fuel efficiency improvement is damaged if the vehicle body is increased in weight to improve the vehicle body stiffness. In the motorcycle with turbocharger, it is necessary to attain inconsistent requirements of the improvement in the vehicle body stiffness and a reduction in weight of the vehicle body.

SUMMARY OF THE INVENTION

The present invention is made in consideration of the above-stated problems, and an object thereof is to provide a motorcycle with turbocharger which enables a simple and optimum pipe disposition, and effectively contributes to a low center of gravity and so on of a vehicle.

Besides, another object of the present invention is to provide a motorcycle with turbocharger capable of enabling high protectiveness for control parts by a simple and compact configuration.

Further, still another object of the present invention is to provide a motorcycle with turbocharger capable of enabling both an improvement in vehicle body stiffness and a reduction in weight of the vehicle body.

A motorcycle with turbocharger according to the present invention includes: an engine in which an exhaust pipe is connected to a front side of a cylinder head, and throttle bodies are connected to a rear side of the cylinder head; an air cleaner which filtrates fuel air; a turbocharger which compresses intake fuel air; an air intake pipe which connects the air cleaner and the turbocharger; and an intake passage which induces the fuel air taken from an intake port at an end part to the air cleaner, wherein the turbocharger is located at a front side lower part of the engine, and the air cleaner is located under a crankcase.

Besides, in the motorcycle with turbocharger of the present invention, an air outlet pipe which is connected to a downstream side of the turbocharger, and one or more control parts which control opening/closing of an intake or exhaust passage in accordance with a state in the intake or exhaust passage are included, wherein the control parts are located at a rear of the turbocharger and at least a part thereof overlaps with any of the turbocharger, or the air intake pipe and the air outlet pipe when it is seen from a vehicle body front surface.

Besides, in the motorcycle with turbocharger of the present invention, the engine is supported by the vehicle body frame, and an intercooler which cools the fuel air compressed by the turbocharger and supplies to the throttle bodies is included, and the vehicle body frame includes: a left and right pair of body frames which extends rearward and downward of a vehicle body from a steering head pipe; and a piece of hollow state pivot frame which is bent from a rear end of the body frame part, and extends downward toward a pivot shaft.

DETAILED DESCRIPTION OF THE PREFERRED EMBODIMENTS

Hereinafter, preferred embodiments of a motorcycle with turbocharger according to the present invention are described based on the drawings.

Figure 1:
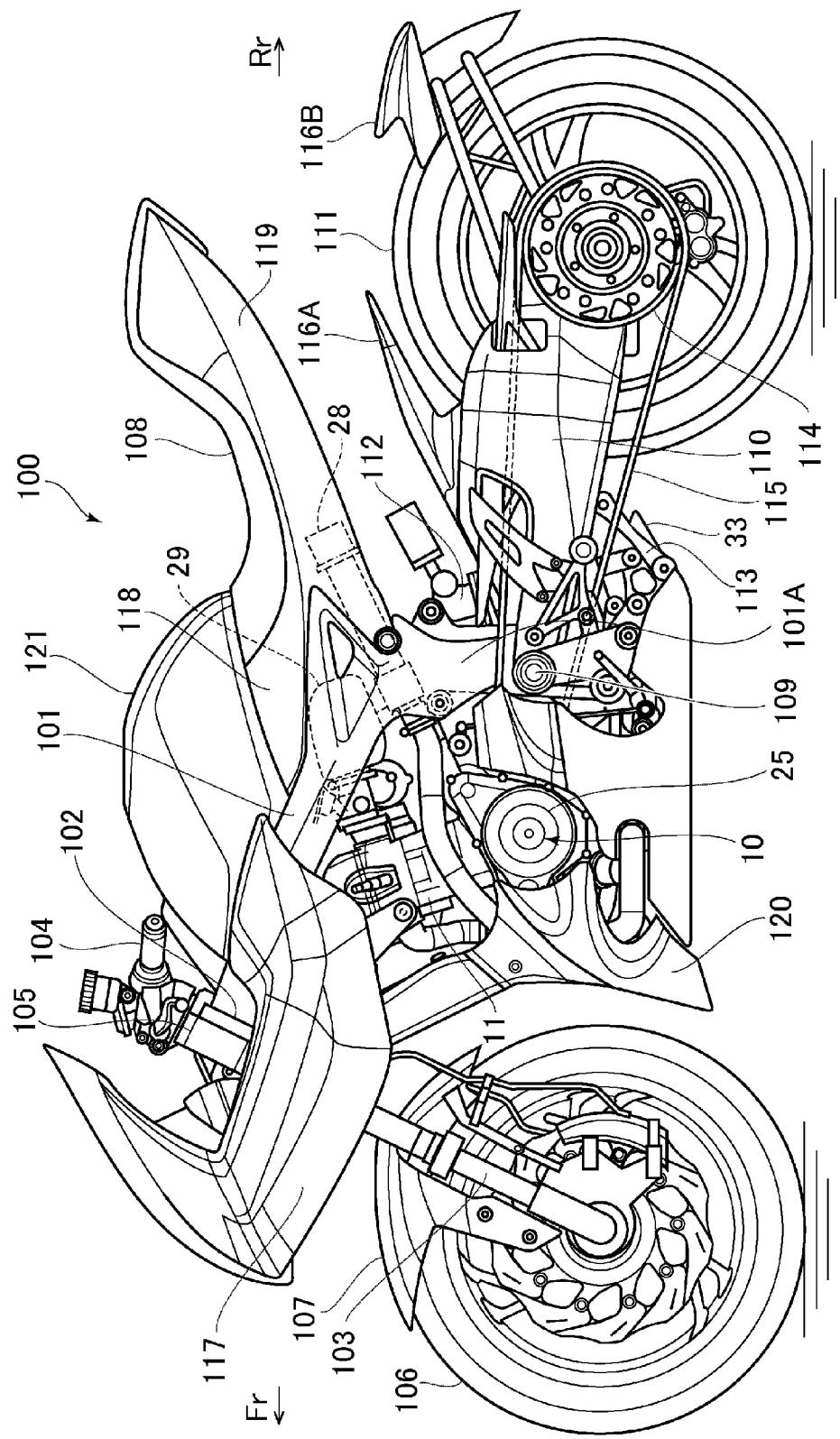
FIG. 1 is a side view of a motorcycle according to an embodiment of the present invention.
Figure 2:
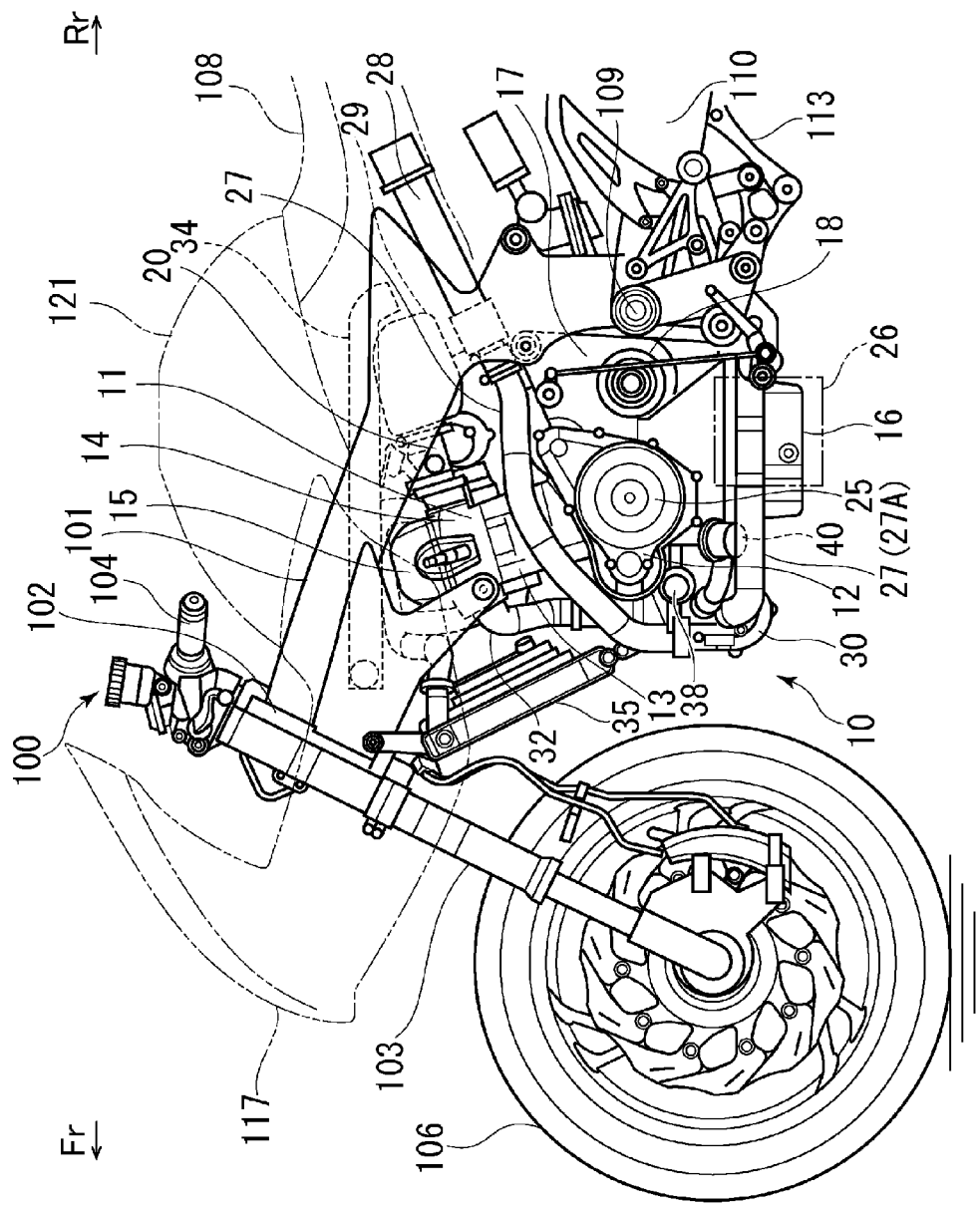
FIG. 2 is a side view of the motorcycle in a state in which exterior parts are detached according to the embodiment of the present invention.
Figure 3:
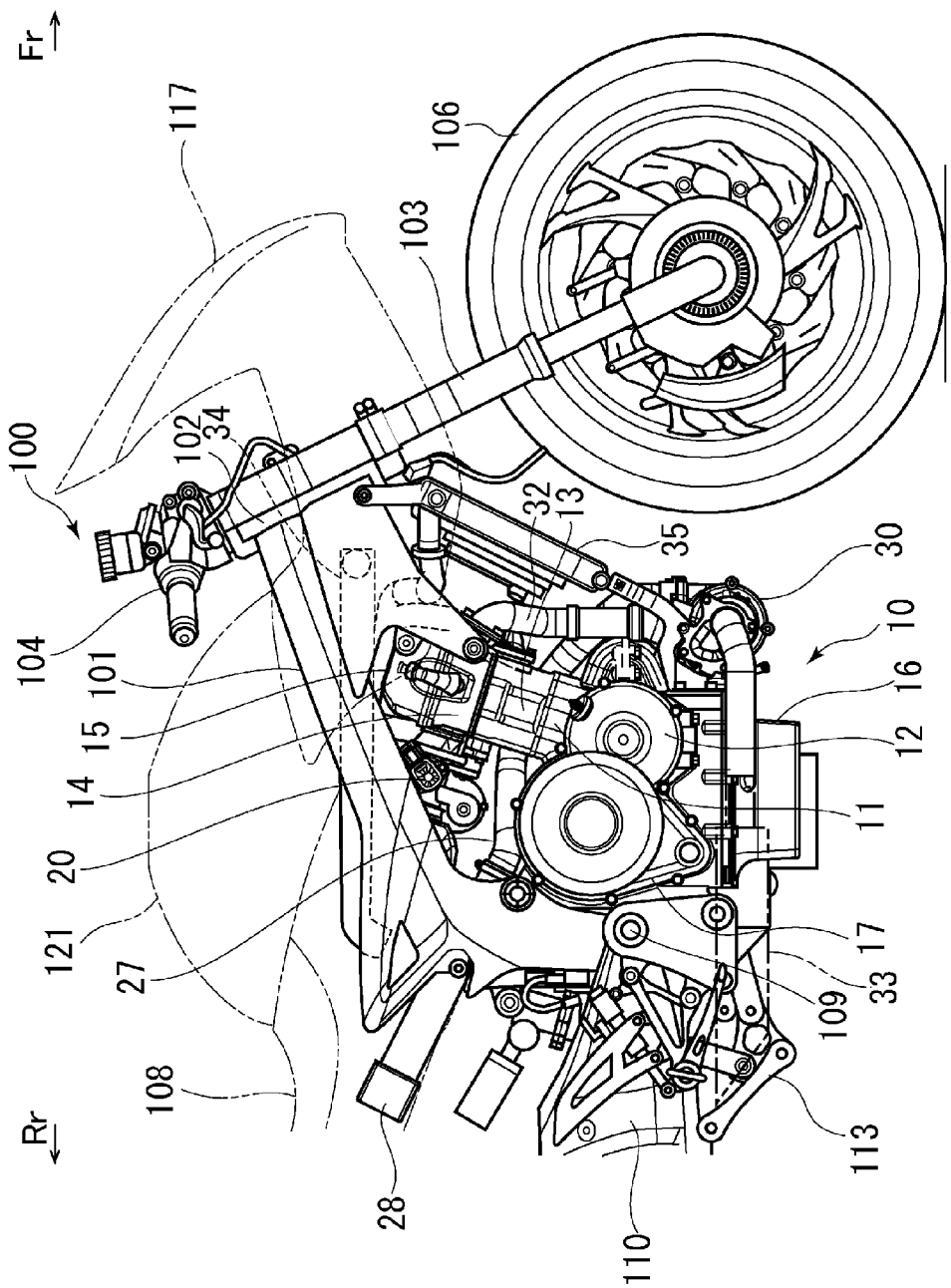
FIG. 3 is side view of the motorcycle in the state in which the exterior parts are detached according to the embodiment of the present invention.

FIG. 1 to FIG. 3 each illustrates a schematic configuration of a motorcycle 100 as an application example of the present invention. FIG. 1 is a side view of a whole vehicle, and FIG. 2 and FIG. 3 each are a side view thereof, with exterior parts being detached. At first, a whole configuration of the motorcycle 100 is described by using these drawings. Note that in the drawings used in the following description including FIG. 1 to FIG. 3, a front side of a vehicle is represented by an arrow Fr, a rear side of the vehicle is represented by an arrow Rr, a lateral right side of the vehicle is represented by an arrow R, and a lateral left side of the vehicle is represented by an arrow L according to need.

In FIG. 1 to FIG. 3, two left and right front forks 103 which are supported by a steering head pipe 102 so as to be pivotable left and right are provided at a front part of a vehicle body frame 101 made of steel or an aluminum alloy material. A handlebar 104 is fixed via a steering bracket 105 at upper ends of the front forks 103. A front wheel 106 is rotatably supported and a front fender 107 is fixed so as to cover an upper part of the front wheel 106 at lower parts of the front forks 103.

The vehicle body frame 101 is integrally joined to a rear part of the steering head pipe 102 and bifurcates rearward into a pair of left and right parts, then the vehicle body frame 101 extends while expanding from the steering head pipe 102 rear downward, and this part is a body frame of the vehicle body frame 101. In this example, the vehicle body frame 101 may be what is called a twin-spar type frame which is employed as being suitable for vehicles and so on requiring high speed performance. Incidentally, a seat rail, though it is not illustrated, extends rearward from the vicinity of a rear part of the vehicle body frame 101 while moderately inclining rear upward, to support a seat 108 (seating seat). Further, the left and right parts of the vehicle body frame 101 join to each other while curving or bending downward at the vicinity of rear end parts thereof, so that the whole vehicle body frame 101 has a three-dimensional structure having a space inside.

A swing arm 110 is joined to the vicinity of a rear end downward of the vehicle body frame 101 via a pivot shaft 109 so as to be swingable up and down. A rear wheel 111 is rotatably supported at a rear end of the swing arm 110. In this example, the rear wheel 111 is supported at a rear part side of the swing arm 110 in a cantilever manner. A rear shock absorber 112 is mounted between the vehicle body frame 101 and the swing arm 110, and especially a lower end side of the rear shock absorber 112 is coupled both to the vehicle body frame 101 and the swing arm 110 via a link mechanism 113. A driven sprocket 114 around which a chain 115 for transmitting motive power of a later-described engine is wound is axially attached to the rear wheel 111, and the rear wheel 111 is driven to rotate via the driven sprocket 114. At an immediate periphery of the rear wheel 111, rear fenders 116A, 116B respectively covering the vicinity of a front upper part and the vicinity of a rear upper part of the rear wheel 111 are provided.

In the vehicle exterior, mainly a front part and left and right side parts of the vehicle are respectively covered by cowlings, in this example, by a half cowl 117 and side cowls 118. Further, at a vehicle rear part, a seat cover or a seat cowl 119 covers a periphery of the seat 108. Further, there is provided an under cowl 120 covering a periphery of a lower part of the later-described engine, and by these exterior members, a vehicle outer form having what is called a streamlined shape is formed. Incidentally, a fuel tank 121 is mounted in front of the seat 108.

Figure 4:
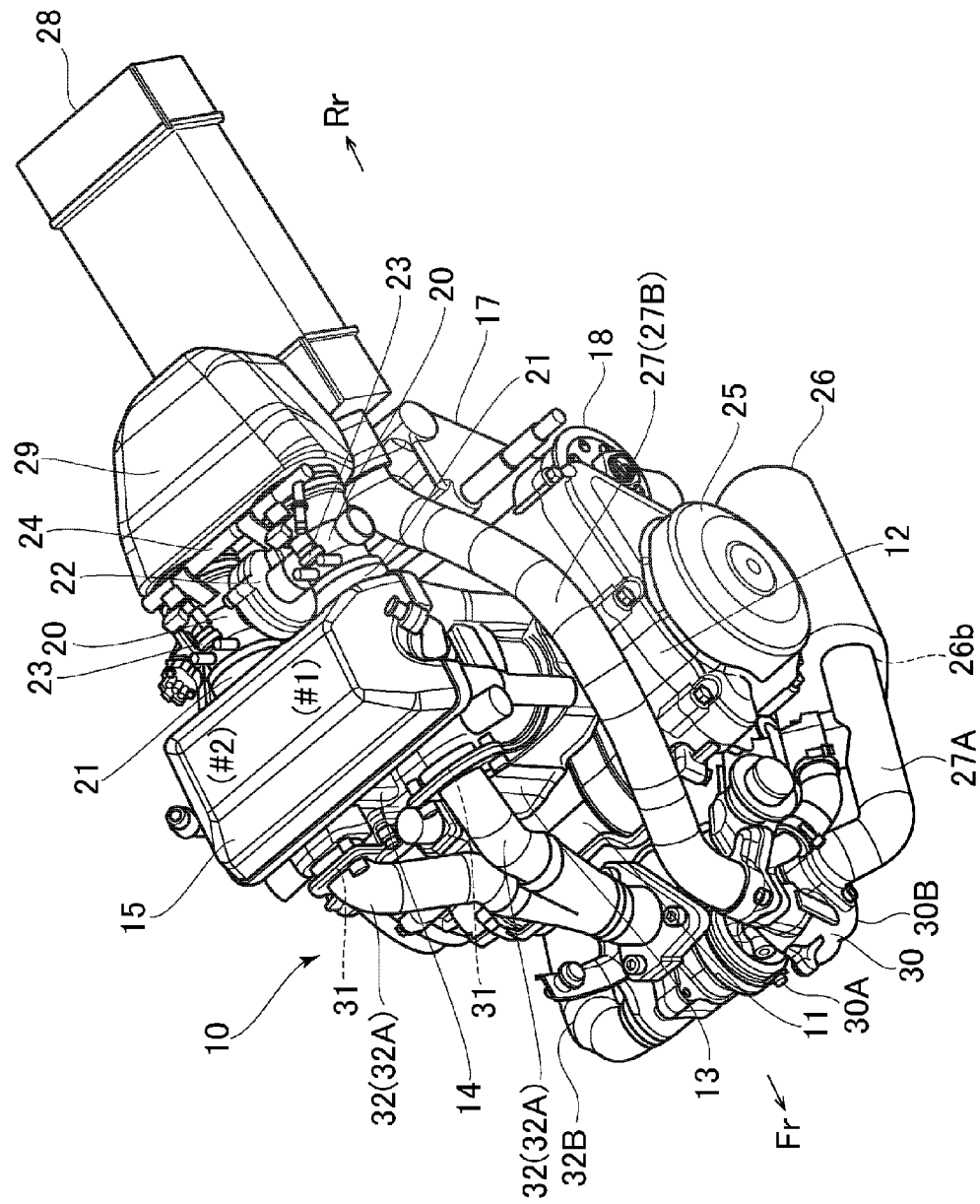
FIG. 4 is a perspective view illustrating an engine unit according to the embodiment of the present invention.
Figure 5:
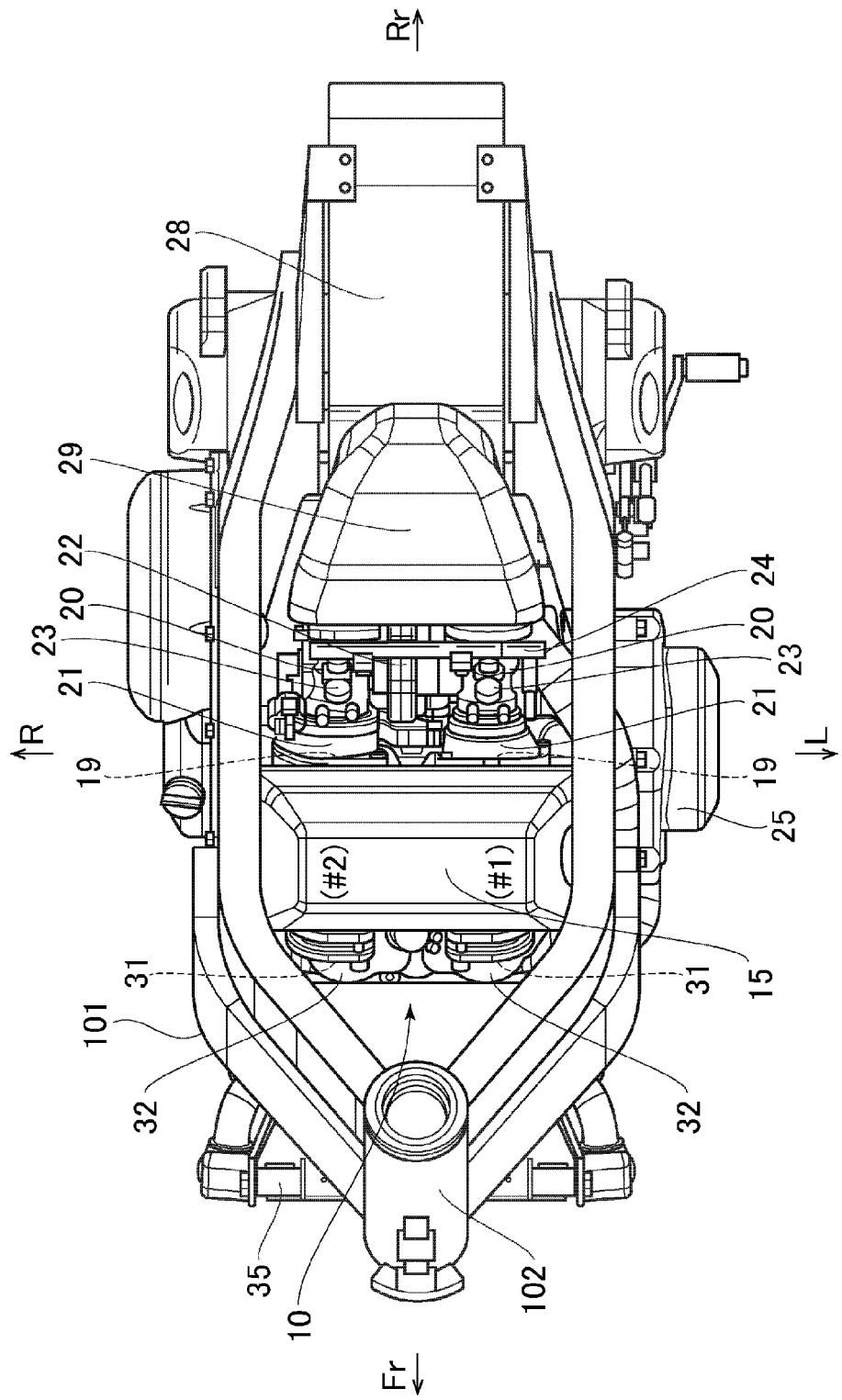
FIG. 5 is an upper surface view at a periphery of the engine unit according to the embodiment of the present invention.

An engine unit 10 is mounted at a substantially vehicle center part of the motorcycle 100. FIG. 4 illustrates an essential part configuration of the engine unit 10. Next, the engine unit 10 will be described with reference to FIG. 4 to FIG. 6. The engine unit 10 has an engine 11 and in this embodiment, a water-cooled multicylinder four-cycle gasoline engine is used. The engine 11 is a parallel two-cylinder engine where a first (#1) cylinder and a second (#2) cylinder are disposed side by side on the left and right (in a vehicle width direction), and above a crankcase 12 housing a crankshaft which is horizontally supported in a right and left direction, cylinders 13, a cylinder head 14, and a cylinder head cover 15 are integrally joined so as to be stacked sequentially (FIG. 4), and an oil pan 16 is attached to a lowest part of the engine 11. Note that a cylinder axis of the engine 11 is disposed to be moderately inclined forward. Such an engine 11 is suspended on the vehicle body frame 101 via plural engine mounts, thereby integrally joined to and supported by an inner side of the vehicle body frame 101, and the engine 11 itself works as a rigid member of the vehicle body frame 101.

At a rear part of the crankcase 12, a transmission case 17 is integrally formed (refer to FIG. 2, and so on), and in the transmission case 17, a counter shaft and plural transmission gears, not illustrated, are disposed. The motive power of the engine unit 10 is transmitted from the crankshaft through a transmission finally to a drive sprocket 18 (refer to FIG. 4, and so on) being its output end, and by this drive sprocket 18, the driven sprocket 114, as a result, the rear wheel 111 is driven to rotate via the chain 115 for power transmission (FIG. 1).

Note that the crankcase 12 and the transmission case 17 are joined integrally to each other and as a whole form a casing assembly of the engine unit 10. Plural auxiliary machines such as a starter motor for engine startup and a clutch device are mounted on or joined to appropriate places of this casing assembly, and the whole engine unit 10 including these is supported by the vehicle body frame 101.

The engine 11 is further provided with an intake system which supplies an air-fuel mixture made of the air (intake air) and a fuel which are supplied from an air cleaner and a fuel supply device (these will be described later) respectively, an exhaust system which discharges exhaust gas after combustion from the engine 11, a cooling system which cools the engine 11, a lubricating system which lubricates movable parts of the engine 11, and a control system (ECU; Engine Control Unit) which controls the operations of the aforesaid systems. Based on the control by the control system, the plural functional systems operate in cooperation with the aforesaid auxiliary machines and so on, so that a smooth operation is executed as the whole engine unit 10.

More concretely, first in the intake system, both the #1 and #2 cylinders have intake ports 19 (their rough positions are outlined by the dotted lines in FIG. 5) which are opened at a rear side of the cylinder head 14, and throttle bodies 20 are connected to the intake ports 19 via intake pipes 21. Throttle valves (not illustrated) which open/close intake air flow paths or passages formed inside the throttle bodies 20 according to an accelerator opening degree are fitted to the throttle bodies 20, whereby a flow rate of the air fed from the later-described air cleaner is controlled. In this example, throttle valve shafts of the #1 and #2 cylinders are disposed coaxially, and a valve driving mechanism 22 which mechanically, electrically, or electromagnetically drives the throttle valve shafts is provided.

On the other hand, in each of the throttle bodies 20, an injector 23 for fuel injection is disposed at a downstream side of the throttle valve, and the fuel in the fuel tank 121 is supplied to the injector 23 by a fuel pump. In this case, an upper side of the injector 23 is connected to a delivery pipe 24 suspended laterally in the vehicle width direction, so that the fuel is distributed from the delivery pipe 24 connected to the fuel pump. The injector 23 injects the fuel to the intake air flow path in the throttle body 20 at a predetermined timing by being controlled by the above-stated control system. Consequently, the air-fuel mixture with a predetermined air-fuel ratio is supplied to the cylinders 13 of the #1 and #2 cylinders.

Figure 6:
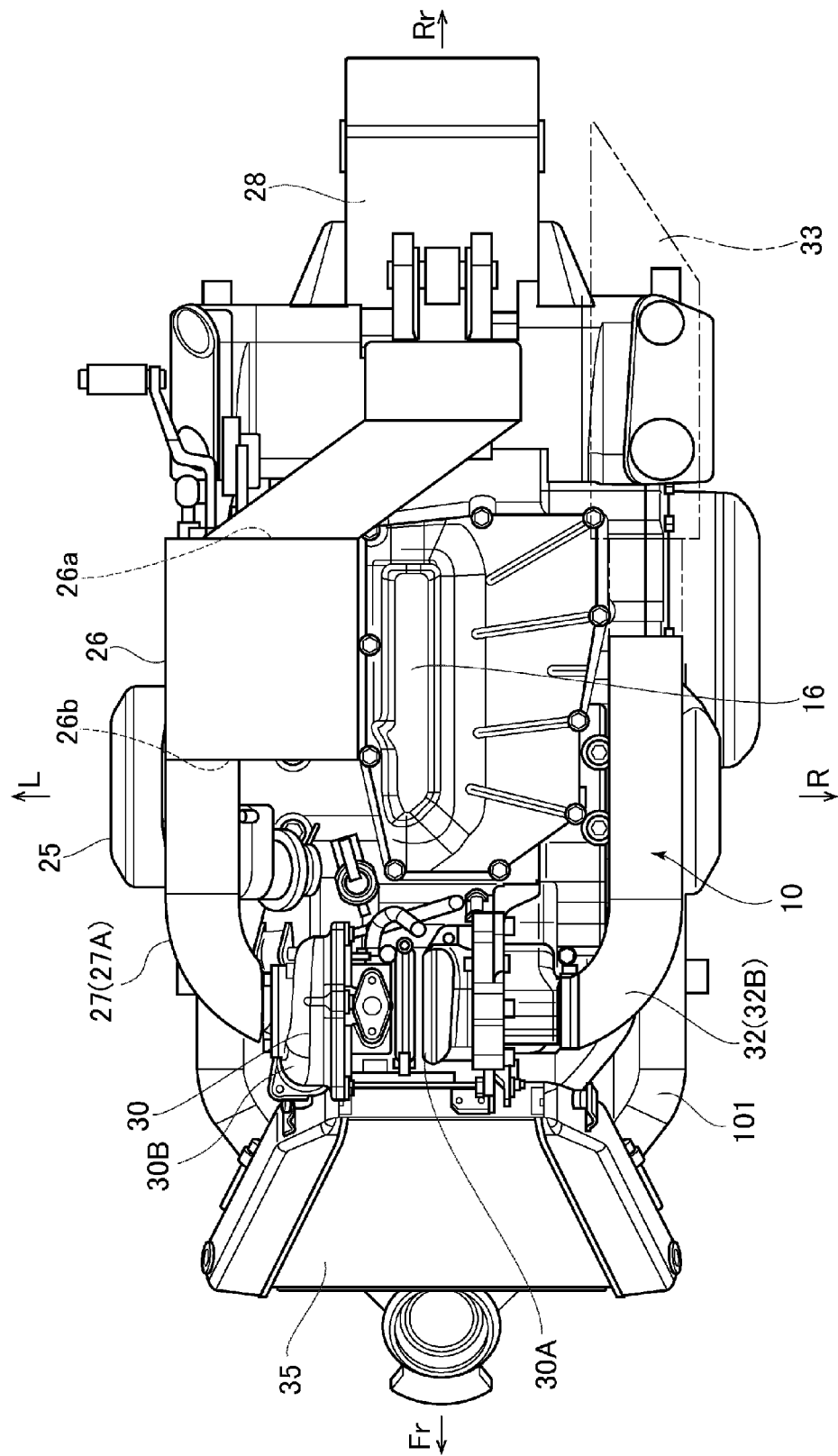
FIG. 6 is a bottom surface view at the periphery of the engine unit according to the embodiment of the present invention.
Figure 7:
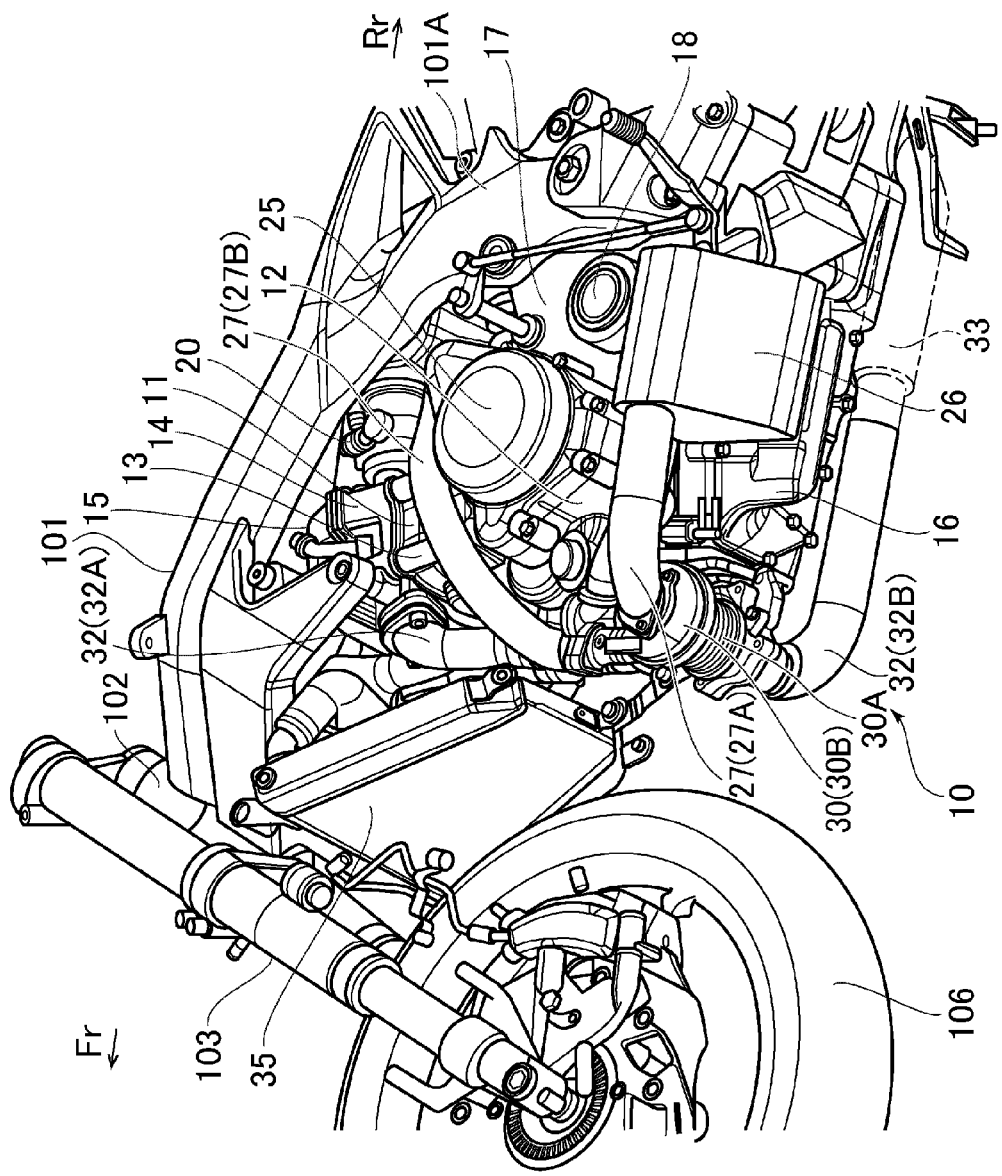
FIG. 7 is a front part lower side perspective view of the motorcycle according to the embodiment of the present invention.
Figure 8:
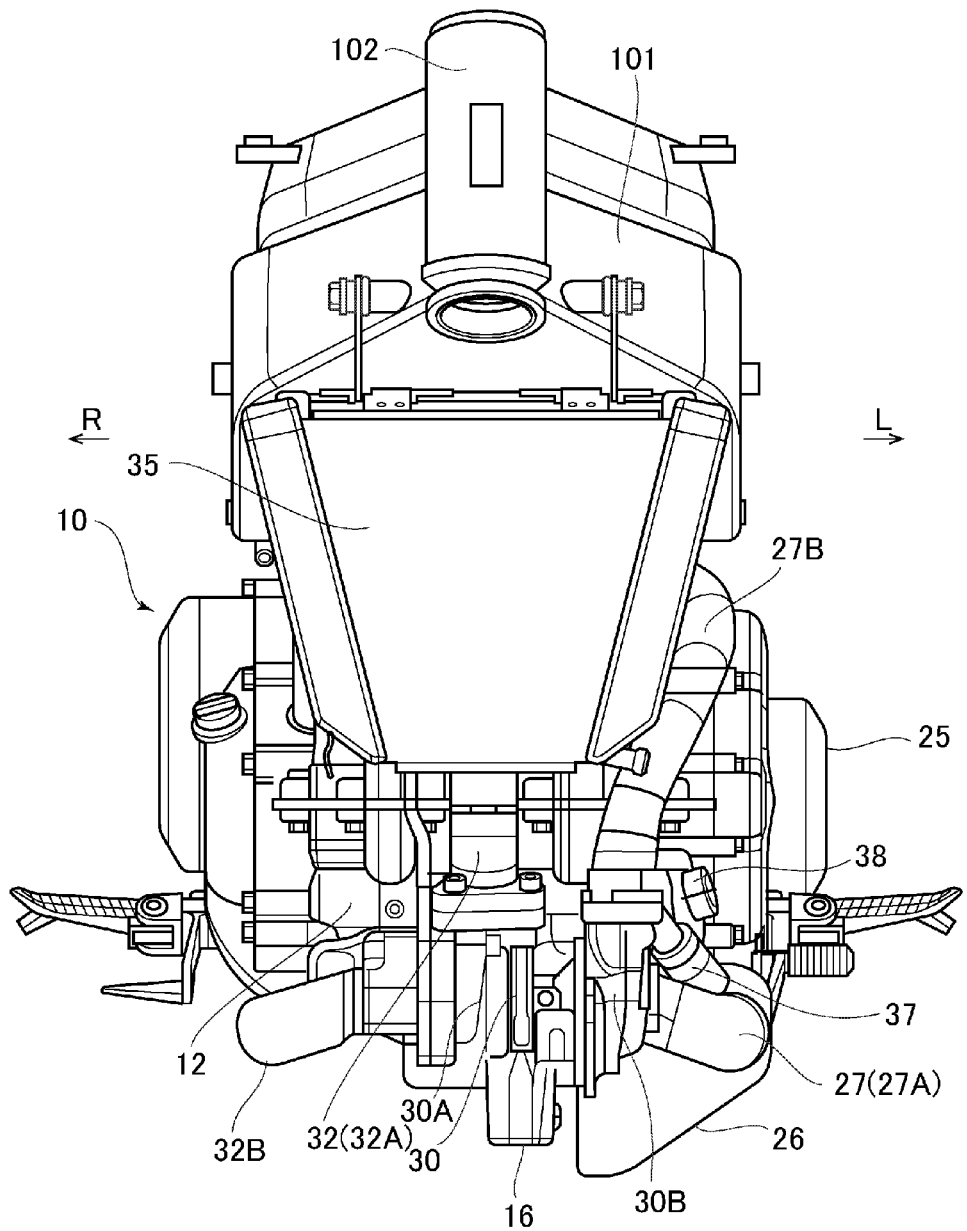
FIG. 8 is a front view of the engine unit according to the embodiment of the present invention.

Here, as illustrated in FIG. 4 or FIG. 6, at the lower part of the engine 11, that is, under a magneto chamber 25 provided at a left side of the crankcase 12, the air cleaner 26 is adjacently disposed at a left side of the oil pan 16 with a predetermined interval. The air cleaner 26 has a box-shaped air cleaner box whose left side surface is inclined inward as it goes downward as illustrated in FIG. 7, FIG. 8, or the like. An air filter is fitted in the air cleaner box, and the air taken into the air cleaner box is cleaned by the air filter. In the air cleaner 26, a flow-in port 26*a* for taking in the air is opened at a rear surface part of the air cleaner box and a flow-out port 26*b* of the cleaned air is opened at a front surface part of the air cleaner box (their rough positions are outlined by the dotted lines in FIG. 6), and an air feed pipe 27 is connected to the flow-out port 26*b*. The air feed pipe 27 extends forward from the air cleaner 26 to go round in front of the crankcase 12, thereafter curves upward, further passes at a left side of the cylinder (#1 cylinder), and is connected to, in this example, an air-cooled intercooler 28 as illustrated in FIG. 4 and so on.

The intercooler 28 cools the air supplied from the air feed pipe 27, and the cooled air is supplied to the throttle bodies 20 of the #1 and #2 cylinders via a surge tank 29. This example includes a turbocharger 30 (turbocharger) which is disposed in a middle of the air feed pipe 27 in the intake system, that is, in front of the engine 11 and compresses the intake air. The air compressed by a compressor of the turbocharger 30 generates heat and therefore, as it is, intake efficiency of the engine 11 deteriorates. The air supplied from the turbocharger 30 is cooled by the intercooler 28 at an intake upstream side of the throttle bodies 20, and thereby, it is possible to effectively improve the intake efficiency. Note that the air cleaner 26 is located at a lateral lower part of the engine 11, and is approximated to the turbocharger 30, and thereby, it is possible to shorten the pipes.

Next, in the exhaust system, the #1 and #2 cylinders both have exhaust ports 31 (their rough positions are outlined by the dotted lines in FIG. 4) which are opened at a front side of the cylinder head 14, and exhaust pipes 32 are connected to the exhaust ports 31. The exhaust pipes 32 of the respective cylinders once extend downward from the exhaust ports 31 and join together in front of the cylinders 13 to be integrated as illustrated in FIG. 4. The exhaust pipe 32 thereafter goes round to a right side lower part of the crankcase 12 and further extends rearward as illustrated in FIG. 6. A muffler 33 (a part thereof is illustrated in FIG. 1) is attached to a rear end of the exhaust pipe 32. In this example, in a middle of the exhaust pipe 32, a driving part side of the turbocharger 30, that is, a turbine is disposed, and the compressor of the turbocharger 30 driven to rotate by this turbine is disposed in the middle of the air feed pipe 27. Thus, this embodiment employs the turbocharger which pressurizes the air sent from the air cleaner 26 by utilizing an exhaust stream of the engine 11 and supplies to the intercooler 28.

Note that subsidiary to the above-stated intake system, an air introduction means which introduces cooing air for the intercooler 28 is included. In this example, for example, an air duct 34 which is extended in a forward and backward direction is included under the fuel tank 121 as it is schematically illustrated in FIG. 2 and FIG. 3. The air duct 34 introduces air such that traveling air which is taken from a front end part of the half cowl 117 is supplied to a front end part thereof, and the cooling air is supplied from a rear end part thereof for the intercooler 28.

Besides, in the cooling system, a water jacket, though the details are not illustrated, is formed around a cylinder block including the cylinders 13 so as to make the cooling water circulate therein. As illustrated in FIG. 7, FIG. 8, and so on, a radiator 35 which cools the cooling water fed to the water jacket is equipped. In this example, the radiator 35 has a trapezoidal shape whose upper base side is longer than a lower base side when it is seen from a front side as illustrated in FIG. 8, and is disposed to extend from the vicinity of a lower end of the steering head pipe 102 up to the vicinity of a front side of the crankcase 12 while moderately inclining rearward as illustrated in FIG. 2, FIG. 3, and so on. The cylinder block of the engine 11 is substantially covered by the radiator 35 as illustrated in FIG. 8. Note that the radiator 35 is supported at appropriate places by using the vehicle body frame 101 and so on at a front part of the engine unit 10.

Further, the lubricating system which supplies lubricating oil to the movable parts of the engine unit 10 to lubricate them is made up. In this lubricating system, though the details are not illustrated similarly, valve driving devices formed in the crankshaft and the cylinder head 14, cam chains coupling them, a transmission, and so on are included. In this embodiment, an ordinary oil pump is used for the lubricating system, and the lubricating oil pumped up from the oil pan 16 is sent to the lubricating system by this oil pump.

Here, basic operations and so on in the present invention will be described. First, by providing the turbocharger 30, it is possible to simultaneously enable a practical reduction in an exhaust rate and an improvement of the intake efficiency of the engine 11. In this case, the air pressurized by the turbocharger 30 is cooled by the intercooler 28, and thereby, deterioration of the intake efficiency is prevented, and a fuel efficiency improvement and an output power increase are enabled.

In addition to the above, disposing the intercooler 28 adjacent to the surge tank 29 can shorten an air route therebetween to improve throttle response. Further, this can decrease the number of pipes, resulting in a weight reduction and a reduction in the number of parts. Further, disposing the intercooler 28 at the rear of the engine 11 can simplify a layout at a front side of the engine 11 where the radiator 35, the exhaust pipes 32, and the turbocharger 30 (mainly in the case of the turbo) are disposed.

Besides, the turbocharger 30 is disposed in front of the intercooler 28, and thereby, the turbocharger 30 is disposed in the vicinity of the engine 11, and the intake system parts are integrated, and thereby, it is possible to shorten and simplify the pipes. Besides, weights of parts concentrate on a vehicle body center part, and therefore, operability of the vehicle improves. In this example, the turbocharger 30 which compresses the intake air by using the exhaust stream, what is called the turbo, is necessary to be disposed in front of the engine 11 in adjacent to the exhaust pipe 32 extending from the front side of the cylinders 13, on the other hand, the intercooler 28 is disposed at the rear side, and thereby, the layout in front of the engine 11 is simplified.

Besides, though a detailed illustration is not given, in the intercooler 28, the flow-in port and the flow-out port of the air are located at one side (a front half part of the vehicle body), and an internal air flow path becomes approximately a U-shape. Accordingly, it has a constitution in which the flow path of the air is folded in the intercooler 28, and thereby, it is possible to set the intercooler 28 wider for an extent of an occupied space of a conventional U-shape pipe compared to a case when a fold type U-shape pipe is provided. It is thereby possible to maximally make use of a limited room or a space at the lower side of the seat 108, and therefore, cooling efficiency of the intake air improves, and the number of parts can be reduced.

Further, the intercooler 28 is located under the seat 108 and at least a part thereof is located more rearward than a front end of the seat 108. Therefore, since the intercooler 28 generating high-temperature exhaust heat air is disposed under (directly under or at the rear) of the seat 108, the exhaust heat air does not easily hit against a passenger as compared with a case where the intercooler 28 is disposed in front of the seat 108, which improves comfortability of the passenger.

Incidentally, in the motorcycle with turbocharger of the present invention, the turbocharger 30 is located at a front side lower part of the engine 11 as stated above, and the air cleaner 26 is located under the crankcase 12. Here, as illustrated in FIG. 6 and FIG. 8, the oil pan 16 is substantially disposed to be long in a forward and backward direction at an approximately a center in the vehicle width direction, and is projectingly provided downward from a bottom part of the crankcase 12. The air cleaner 26 is adjacently provided at a left side of the oil pan 16, that is, disposed to deviate toward left side in the vehicle width direction. In this example, as illustrated in FIG. 6 and FIG. 7, an intake passage 36 inducing the air taken from an intake port at an end part thereof to the air cleaner 26 is included at a rear side of the air cleaner 26, and a detail thereof is described later. Note that at the air feed pipe 27 in which the turbocharger 30 is disposed in the middle thereof, an upstream side of the turbocharger 30 is set to be an air intake pipe 27A as illustrated in FIG. 6 and later, and the air cleaner 26 and the turbocharger 30 are connected via the air intake pipe 27A.

Figure 9:
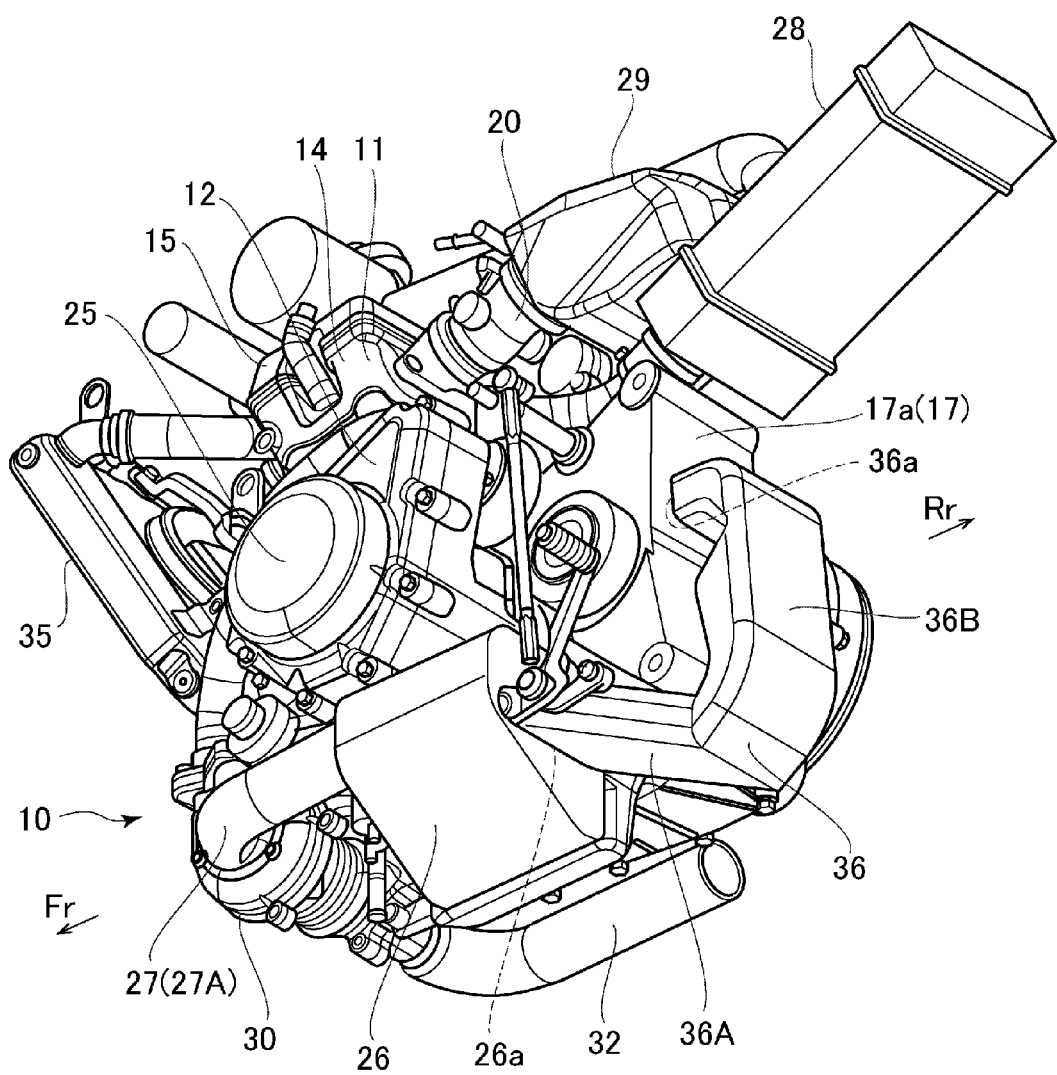
FIG. 9 is a lower side perspective view illustrating a periphery of an air cleaner at the engine unit according to the embodiment of the present invention.

The intake passage 36 extends rearward from the rear part of the air cleaner 26, and thereafter, bends upward as illustrated in FIG. 9. Here, as stated above, the vehicle body frame 101 curves or bends downward at the vicinity of the rear end part, but the pivot shaft 109 is set in the vicinity of the rear end lower part. With reference to FIG. 7, a bent part lower portion of the vehicle body frame 101 is set to be a pivot frame 101A, and the air cleaner 26 is disposed at a front side lower part of the pivot frame 101A (FIG. 7). In the pivot frame 101A, a left and right pair of twin spar frames making up the vehicle body frame 101 joins with each other with a predetermined interval, and it is made up by including a later-described front wall and rear wall to join them. The pivot frame 101A has a hollow structure which is schematically a cylindrical part where a space is formed therein. The intake passage 36 is inserted into the pivot frame 101A so as to be located at an inner side of the cylindrical part of the pivot frame 101A.

More concretely, as illustrated in FIG. 9, the intake passage 36 is made up of an extending part 36A which approximately horizontally extends rearward from the air cleaner 26 and a bending part 36B which bends upward from a rear end part of the extending part 36A, and it has approximately L-shape by these two extending part 36A and bending part 36B when it is seen from a lateral side. In this case, the extending part 36A is connected to the flow-in port 26a of the air cleaner 26, but the air cleaner 26 in itself deviates toward left side in the vehicle width direction as stated above. Accordingly, the extending part 36A extends diagonally rearward right from the air cleaner 26, and extends up to a lower end part (a center in the vehicle width direction) of the pivot frame 101A.

Figure 10:
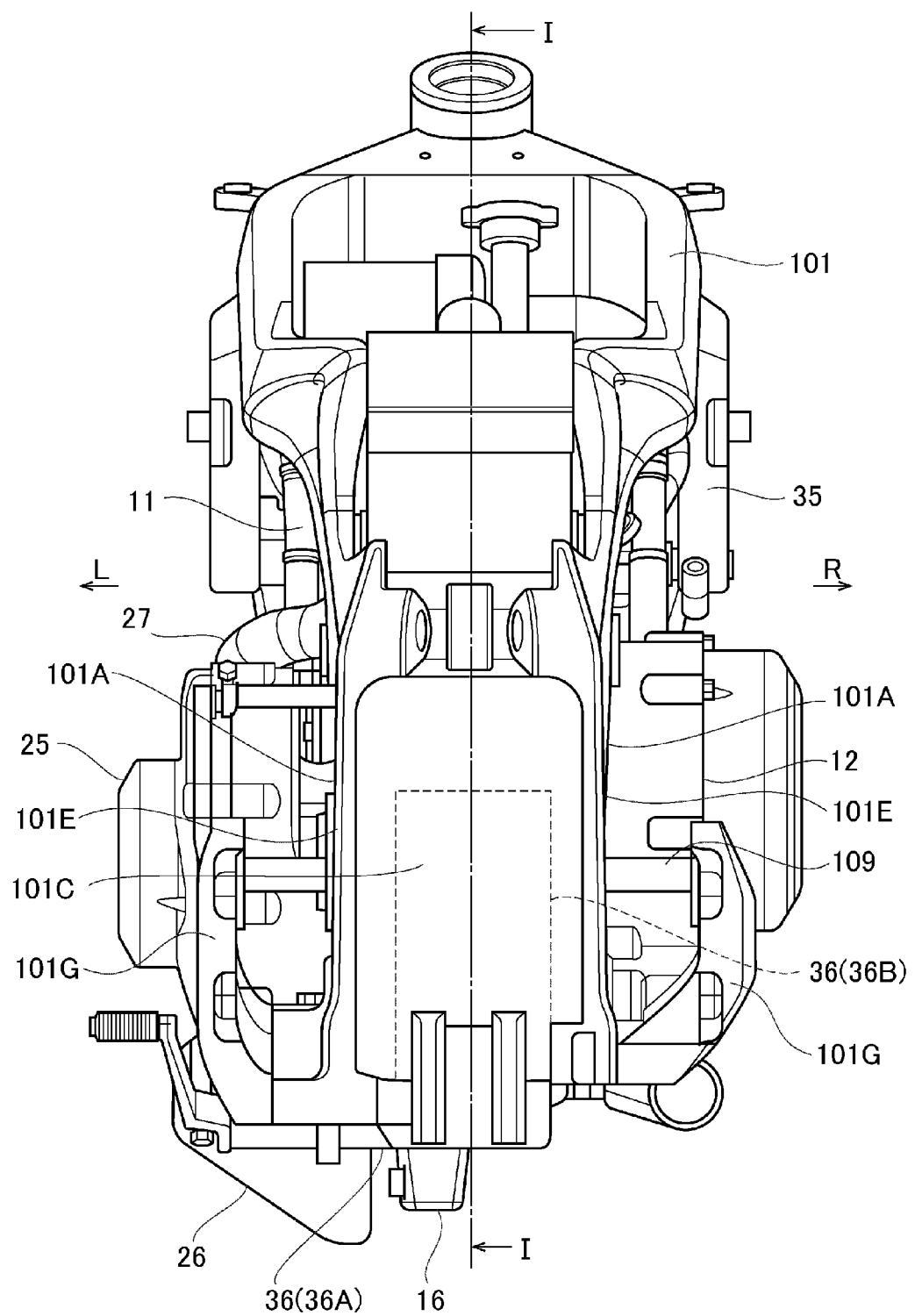
FIG. 10 is a view illustrating a periphery of a vehicle body frame when it is seen from a rear surface of the motorcycle according to the embodiment of the present invention.
Figure 11:
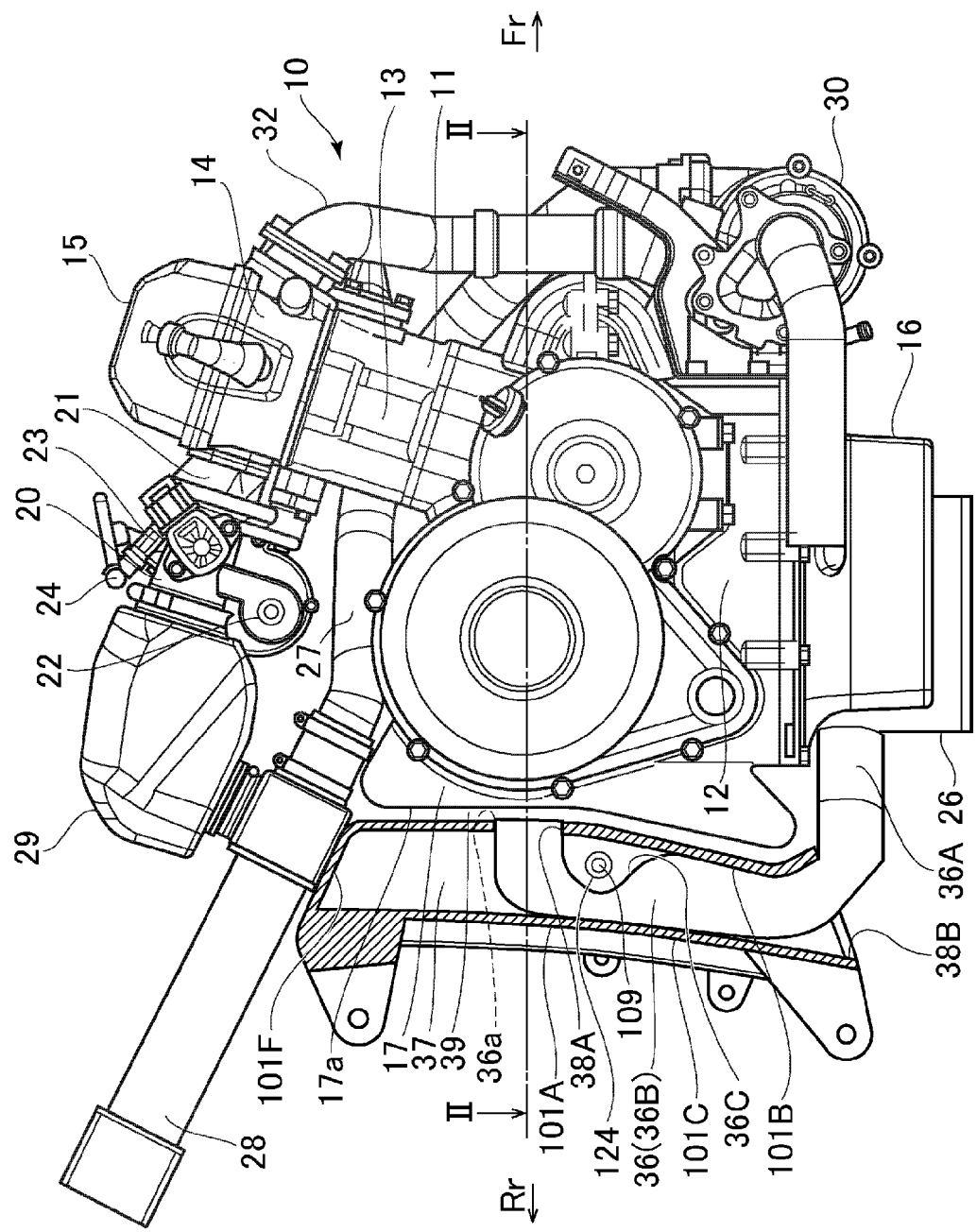
FIG. 11 is a sectional view along a I-I line in FIG. 10.
Figure 12:
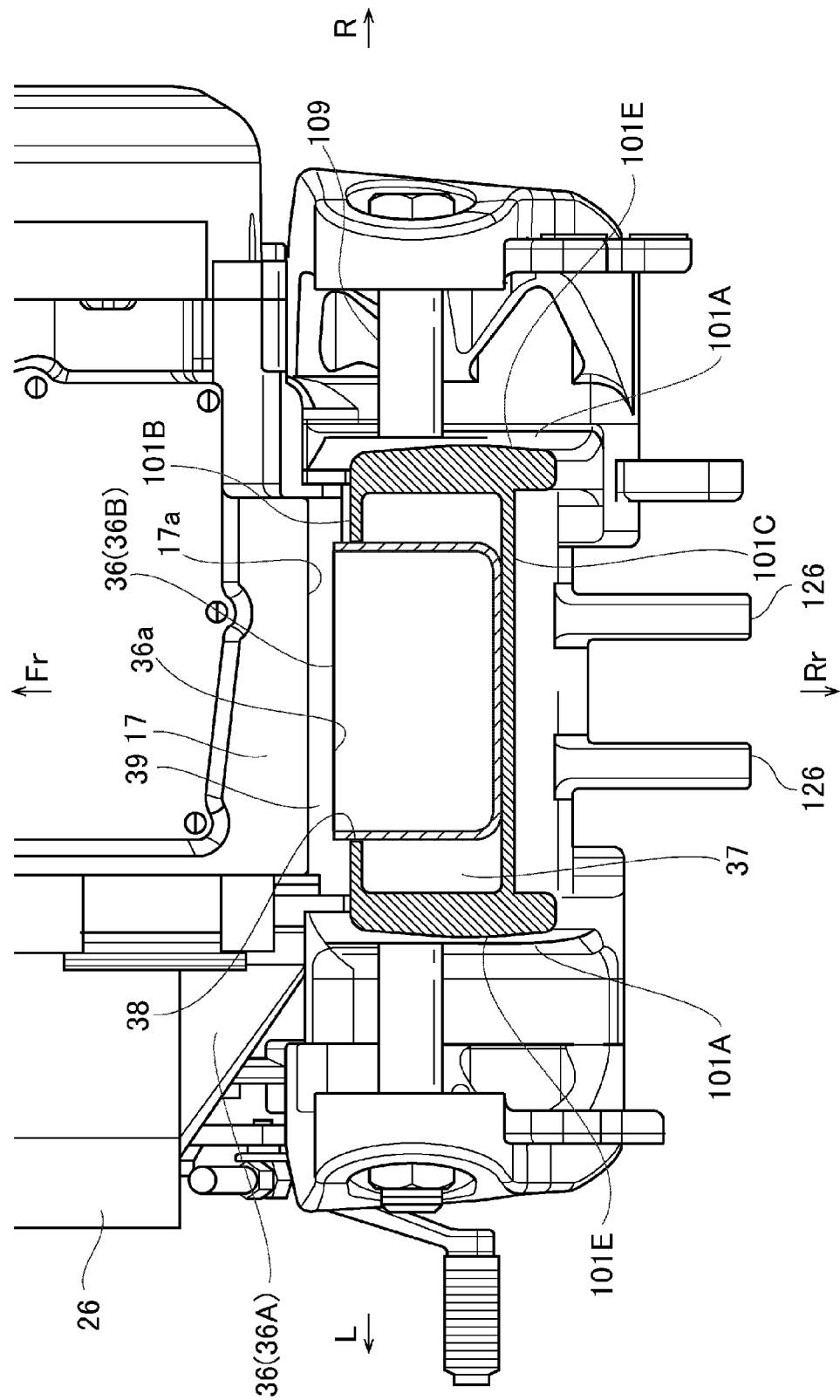
FIG. 12 is a sectional view along a II-II line in FIG. 11.

Here, a configuration of the pivot frame 101A is described. FIG. 10 illustrates the vehicle body frame 101 when it is seen from a rear surface. The left and right parts of the pivot frame 101A are joined with each other via a rear wall 101C illustrated in FIG. 10 and a front wall 101B which is disposed with a predetermined interval at a front side of the rear wall 101C as illustrated in FIG. 11, and they are integrally joined as the whole pivot frame 101A. Namely, the front wall 101B and the rear wall 101C are made up as a part of the pivot frame 101A, and they are integrally joined to form a cylindrical part 37 in an approximately rectangular cross-sectional shape as illustrated in FIG. 11 and FIG. 12 in this example. This cylindrical part 37 is substantially extended along approximately a longitudinal direction.

An intake port 36a is opened at a tip of the bending part 36B as illustrated in FIG. 9 and FIG. 11, and the air is taken from this intake port 36a. Note that the intake port 36a is located at an upper side than the pivot shaft 109. In this case, the bending part 36B bends forward at an upper end part, and the intake port 36a is provided in a mode facing forward. An opening 38A (upper side opening) to expose the intake port 36a is opened at the front wall 101B (FIG. 11 and FIG. 12). Further, a moderate void or gap 39 is formed between the front wall 101B and a rear surface 17a of the transmission case 17 (refer also to FIG. 9) with correspond to the intake port 36a as illustrated in FIG. 11. It is possible to take in the air from the intake port 36a via this void 39. Note that an opening 38B (lower side opening) is opened at a bottom part of the cylindrical part 37, namely, at a lower end of the pivot frame 101A, and the opening 38A is located at upside of the opening 38B.

The intake port 36a disposed and configured as stated above is located at a rear of the engine 11, more concretely, the transmission case 17, and is provided to overlap with the engine 11 when it is seen from the vehicle body front surface. The intake port 36a is thereby surrounded its periphery by the pivot frame 101A and the engine 11 (transmission case 17).

Next, main operations and so on in the motorcycle with turbocharger of the present invention are described. At first, the turbocharger 30 is located at the front side lower part of the engine 11, and the air cleaner 26 is located under the crankcase 12.

The air cleaner 26 is provided approximately in the vicinity of a lower part of the engine 11 as stated above, in this embodiment, at a lower part left side of the engine 11, and the air cleaner 26 and the turbocharger 30 are connected via the air intake pipe 27A. The air cleaner 26 is disposed near the turbocharger 30, and therefore, a length of the air intake pipe 27A connecting between both can be made short. It is possible to shorten the air intake pipe 27A compared to a conventional disposition at under the fuel tank, and it is superior in a layout and an external appearance owing to a simple piping. In this case, the air cleaner 26 and the turbocharger 30 are intensively disposed in the vicinity of the lower part of the engine 11, and thereby, it effectively contributes to enable a low center of gravity.

Besides, the intake passage 36 is made up of the extending part 36A and the bending part 36B, namely, it extends rearward from the rear part of the air cleaner 26, and thereafter, bends upward.

The intake passage 36 is bent upward, and the intake port 36a is provided at the upper side. The intake port 36a is provided at the higher position than the pivot shaft 109, and thereby, it is possible to suppress the mixing of foreign matters such as water and mud. The air cleaner 26 is disposed at the lower part, but it is possible to prevent that moisture and so on are induced thereto, and a proper function thereof is guaranteed.

In the above-stated case, the intake passage 36 further bends forward after it bends upward, and the intake port 36a is provided in a mode facing forward.

The intake port 36a of the intake passage 36 is opened in the void 39, and takes in the air via the void 39. An opening direction of the intake port 36a is faced forward, and thereby, it is possible to prevent waterdrop and dust from dropping and entering into the intake port 36a.

In this case, the intake port 36a is provided to expose from the opening 38A (upper side opening), and is disposed such that the intake port 36a can be seen from the opening provided at the upper side of the pivot frame 101A, and thereby, it is possible to protect the intake passage while keeping an intake performance.

Besides, the intake port 36a of the intake passage 36 is located at the rear of the engine 11, and is provided to overlap with the engine 11 when it is seen from the vehicle body front surface.

The intake port 36a of the intake passage 36 is provided at the immediate rear of the engine 11, and thereby, it becomes a mode in which the intake port 36a is surrounded by the engine 11 and the vehicle body frame 101, particularly by the pivot frame 101A, and a suppression effect of the mixing of the foreign matters improves, and a damage for the intake passage 36 by scattering stones and so on can also be prevented.

Besides, the intake passage 36 is inserted into the opening 38B (lower side opening) of the pivot frame 101A such that at least a part thereof is located at an inner side of the cylindrical part 37 of the pivot frame 101A (FIG. 11).

The intake passage 36 is inserted into a cylindrical space of the pivot frame 101A so as not to protrude outside, and thereby, it does not get in the way of other parts, and it is possible to surely protect from damage elements such as water, mud, scattering stones, and so on. Note that when the intake passage 36 is inserted into the cylindrical part 37 of the pivot frame 101A, it is inserted from a tip side of the bending part 36B, and thereby, it is possible to accommodate almost a whole of the bending part 36B in the cylindrical part 37.

Next, a second embodiment of a motorcycle with turbocharger of the present invention is described. In the second embodiment of the motorcycle with turbocharger of the present invention, one or more control parts which control opening/closing of an intake or exhaust passage in accordance with a state of the intake or exhaust passage is(are) held. Details will be described later, but the control parts are located at the rear of the turbocharger 30, and at least a part thereof overlaps with the turbocharger 30, or either of the air intake pipe or an air outlet pipe as described layer when it is seen from a vehicle body front surface. Note that the turbocharger 30 according to the present invention is a device which compresses the intake air by using the exhaust stream, what is called a turbo. Accordingly, it is necessary to dispose the turbocharger 30 in adjacent to the exhaust pipe 32 extending from a front side of the cylinders 13, and therefore, the turbocharger 30 and the control parts are generally located in front of the engine 11.

Figure 13:
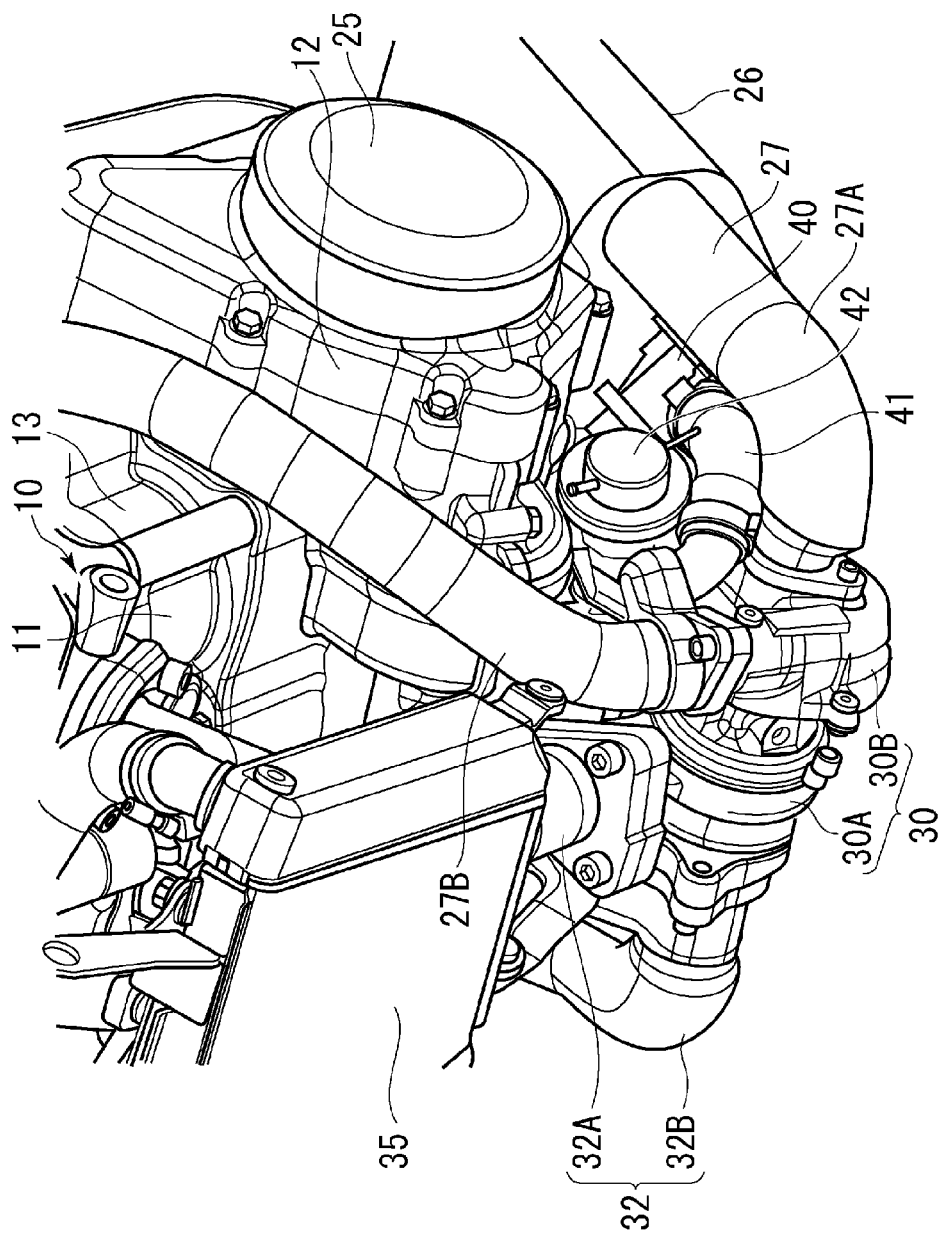
FIG. 13 is a perspective view illustrating a periphery of a turbocharger at an engine unit according to a second embodiment of the present invention.
Figure 14:
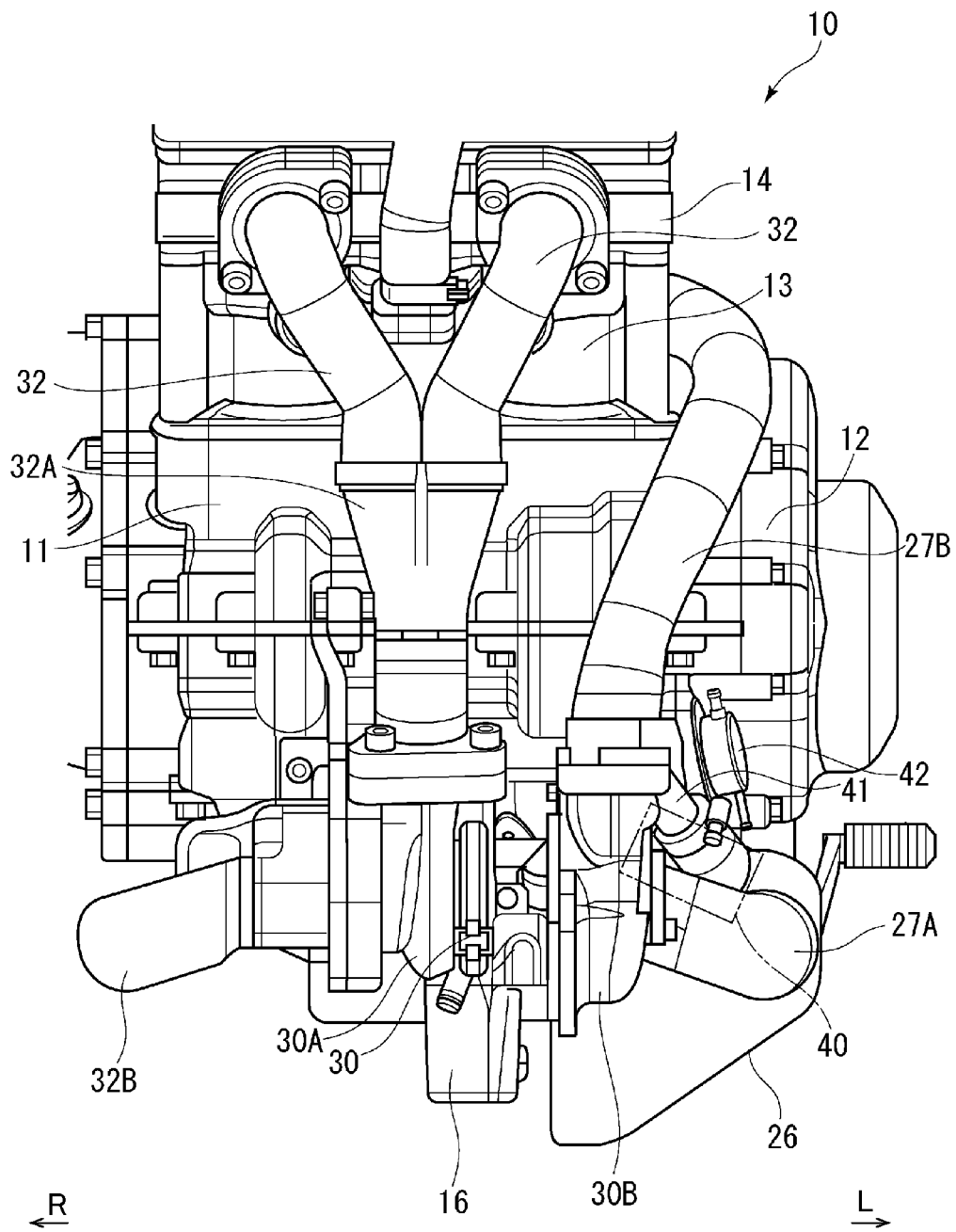
FIG. 14 is a front view illustrating the periphery of the turbocharger at the engine unit according to the second embodiment of the present invention.

Next, characteristic configuration of the present invention is described by using FIG. 13 and FIG. 14. Note that FIG. 1 to FIG. 8 are also appropriately referred to. Here, as illustrated in FIG. 13 and FIG. 14, at the air feed pipe 27 where the turbocharger 30 is disposed in the middle thereof, the air intake pipe 27A is connected to the upstream side of the turbocharger 30, and an air outlet pipe 27B is connected to a downstream side of the turbocharger 30. Besides, at the exhaust pipe 32 where the turbocharger 30 is disposed in the middle thereof, an upstream side of the turbocharger 30 is set to be an exhaust pipe 32A, and a downstream side of the turbocharger 30 is set to be a muffler joint pipe 32B. Further, the turbocharger 30 is made up by including a turbine driving part 30A which includes the turbine disposed at the exhaust pipe 32A side and is operated by the exhaust stream, and a compressor part 30B which is disposed at the air intake pipe 27A side and includes an impeller which is driven to rotate by the turbine driving part 30A, and both are integrally joined to be unitized.

More concretely, as the control parts, an air bypass valve 40 connecting the air intake pipe 27A and the air outlet pipe 27B while bypassing the turbocharger 30 via an air bypass hose 41 is included as illustrated in FIG. 13. In this case, one end of the air bypass hose 41 is connected to the air bypass valve 40, and the other end is connected to the air intake pipe 27A or the air outlet pipe 27B. Note that as stated above, the air intake pipe 27A extends forward from the air cleaner 26, goes round in front of the crankcase 12, and is connected to the turbocharger 30 as the air feed pipe 27. Besides, the air outlet pipe 27B extends upward from the turbocharger 30, passes through the left side of the cylinders 13, and is connected to the intercooler 28.

In this example, the air bypass valve 40 is located at the rear of the turbocharger 30, provided at approximately an intermediate position of the air intake pipe 27A, and is connected to the air intake pipe 27A. As it can be seen from FIG. 13, FIG. 14, and so on, the air bypass valve 40 is provided in a mode inclining inward in a vehicle body width direction when it is seen from the vehicle body front surface. Besides, the air bypass valve 40 is located in front of the crankcase 12 positioning at a lower part of the engine 11, and an outer end thereof is located at a vehicle body inner side than an outer end (left side) of the crankcase 12 when it is seen from the vehicle body front surface.

The air bypass valve 40 which is disposed to be located as stated above is provided such that at least a part thereof overlaps with the turbocharger (concretely, the compressor part 30B) and the air intake pipe 27A when it is seen from the vehicle body front surface as it is outlined in FIG. 14. In this case, the air bypass valve 40 is disposed such that the outer end thereof is located at the vehicle body inner side than an outer end of the air intake pipe 27A.

Besides, as it can be seen from FIG. 13, the air bypass valve 40 is provided such that at least a part thereof overlaps with the air intake pipe 27A also when it is seen from a vehicle body side surface. Note that a relative positional relationship between the air bypass valve 40 and the air intake pipe 27A is also outlined in FIG. 2.

Here, it is described as for an operation timing and so on of the air bypass valve 40. When a throttle is opened and supercharging is performed by the turbocharger 30, the air bypass valve 40 is closed, and when the throttle is closed, the intake pipe 21 side becomes a negative pressure. In this case, the impeller of the turbocharger 30 rotates by inertia, and a state between the throttle and the turbocharger 30 is continued to be pressurized. The impeller is gradually braked, a rotation speed is lowered, and an excessive pressure is rapidly applied as it is when the throttle opens again. To prevent the above-stated state, the air bypass valve 40 is opened, and the pressurized pressure is let out toward an upstream side of the turbocharger 30, namely, toward the air intake pipe 27A side. The operation of the air bypass valve 40 as stated above can be controlled by the ECU based on a signal and so on of a throttle opening degree.

Further, as another control part, a waste gate valve 42 which is connected to an intermediate part of the exhaust pipe 32A to adjust an internal pressure thereof is included as illustrated in FIG. 13, FIG. 14, and so on.

In this example, the waste gate valve 42 is located at the rear of the turbocharger 30, and at least a part thereof is provided to overlap with the turbocharger 30 (concretely, the compressor part 30B), the exhaust pipe 32A or the air outlet pipe 27B when it is seen from the vehicle body front surface.

Besides, the waste gate valve 42 is located at a front side of the crankcase 12 positioning at the lower part of the engine 11, and an outer end thereof is located at the vehicle body inner side than the outer end (left side) of the crankcase 12 when it is seen from the vehicle body front surface.

Further, the waste gate valve 42 is disposed such that the outer end thereof is located at the vehicle body inner side than the outer end of the air intake pipe 27A.

Here, the waste gate valve 42 generally is a valve mechanism which adjusts an inflow amount of exhaust gas to the turbine of the turbocharger by splitting a part of the exhaust gas at a supercharge engine by a turbocharger. A rotation speed of the turbocharger in itself is thereby controlled, a stable supercharging pressure is obtained, and the engine and the turbocharger in itself are protected from damages.

It is described as for the operation timing and so on of the waste gate valve 42. An engine power increases as the supercharging pressure by the turbocharger 30 becomes high, but a virtual exhaust rate simultaneously increases, and therefore, an amount and the pressure of the exhaust gas rapidly increase, and the supercharging pressure endlessly continues to increase as it is. When a certain exhaust pressure or more is applied on the turbocharger 30 together with the increase of the supercharging pressure as stated above, the waste gate valve 42 is operated, and this pressure is bypassed toward the muffler joint pipe 32B side, so that the further supercharging is not to be performed.

Next, main operations and so on in the motorcycle with turbocharger according to the second embodiment of the present invention are described. In this example, the air bypass valve 40 and the waste gate valve 42 are included as the control parts, and these control parts are located at the rear of the turbocharger 30, and at least a part thereof overlaps with the turbocharger 30, or either of the air intake pipe 27A or the air outlet pipe 27B when it is seen from the vehicle body front surface.

The control parts are disposed as stated above, and a front part of the control parts which is small-sized and weak for the shock, the stain, and so on is covered by the turbocharger 30 or the pipes and so on connected thereto, and thereby, it is possible to protect from the scattering stones and so on at the driving time, and the part durability improves.

Besides, the outer ends of the control parts are located at the vehicle body inner side than the outer end of either of the air intake pipe 27A or the air outlet pipe 27B when it is seen from the vehicle body front surface.

The control parts are disposed at an inner side of the air intake pipe 27A or the air outlet pipe 27B such that a vehicle body lateral side does not project, and thereby, protectiveness for collision articles at the vehicle body lateral side improves.

Besides, the waste gate valve 42 is located at the rear of the turbocharger 30, and at least a part thereof is provided to overlap with the turbocharger 30, or the exhaust pipe 32A, or the air outlet pipe 27B when it is seen from the vehicle body front surface.

A front surface of the waste gate valve 42 is covered by the turbocharger 30, or the exhaust pipe 32A or the air outlet pipe 27B, and thereby, a protective effect for the waste gate valve 42 as the control part can be obtained.

Besides, the air bypass valve 40 is provided such that at least a part thereof overlaps with any of the turbocharger 30, the air intake pipe 27A, and the air bypass hose 41 when it is seen from the vehicle body front surface.

A front part of the air bypass valve 40 is covered by the turbocharger 30, or the air intake pipe 27A, and the air bypass hose 41, and thereby, in this case also, the high protective effect for the air bypass valve 40 as the control part can be obtained.

As for the air bypass valve 40, at least a part thereof is provided to overlap with the air intake pipe 27A when it is further seen from the vehicle body side surface.

A lateral side of the air bypass valve 40 is covered by the air intake pipe 27A, and the air bypass valve 40 is surrounded as stated above, and thereby, the further protective effect for the air bypass valve 40 being the control part increases.

When the turbocharger 30 is the device which compresses the intake air by using the exhaust stream, what is called the turbo as in this embodiment, the control parts are located at the rear of the compressor part 30B side together with the air bypass valve 40 and the waste gate valve 42. These control parts are disposed to deviate toward an intake air passage side of the turbocharger 30, and thereby, the control parts are difficult to be affected by exhaust heat of the exhaust pipe 32 (exhaust pipe 32A), and the part durability improves.

In the above-stated case, a part thereof is already described, but the control parts are not necessarily covered by the turbocharger 30. The control parts are covered or surrounded by a number of connection pipes which are provided in the vicinity of the turbocharger 30, and thereby, substantially the similar protective effect can be obtained.

Further, a third embodiment of a motorcycle with turbocharger of the present invention is described. In the third embodiment of the motorcycle with turbocharger of the present invention, subsidiary to the above-stated intake system with reference to FIG. 15, a duct hose part 43 guiding traveling air to an upper surface of the intercooler 28 to cool it is held. The duct hose part 43 making up the above-stated air duct 34 includes an inlet duct part 44 and an outlet duct part 45.

Figure 16:
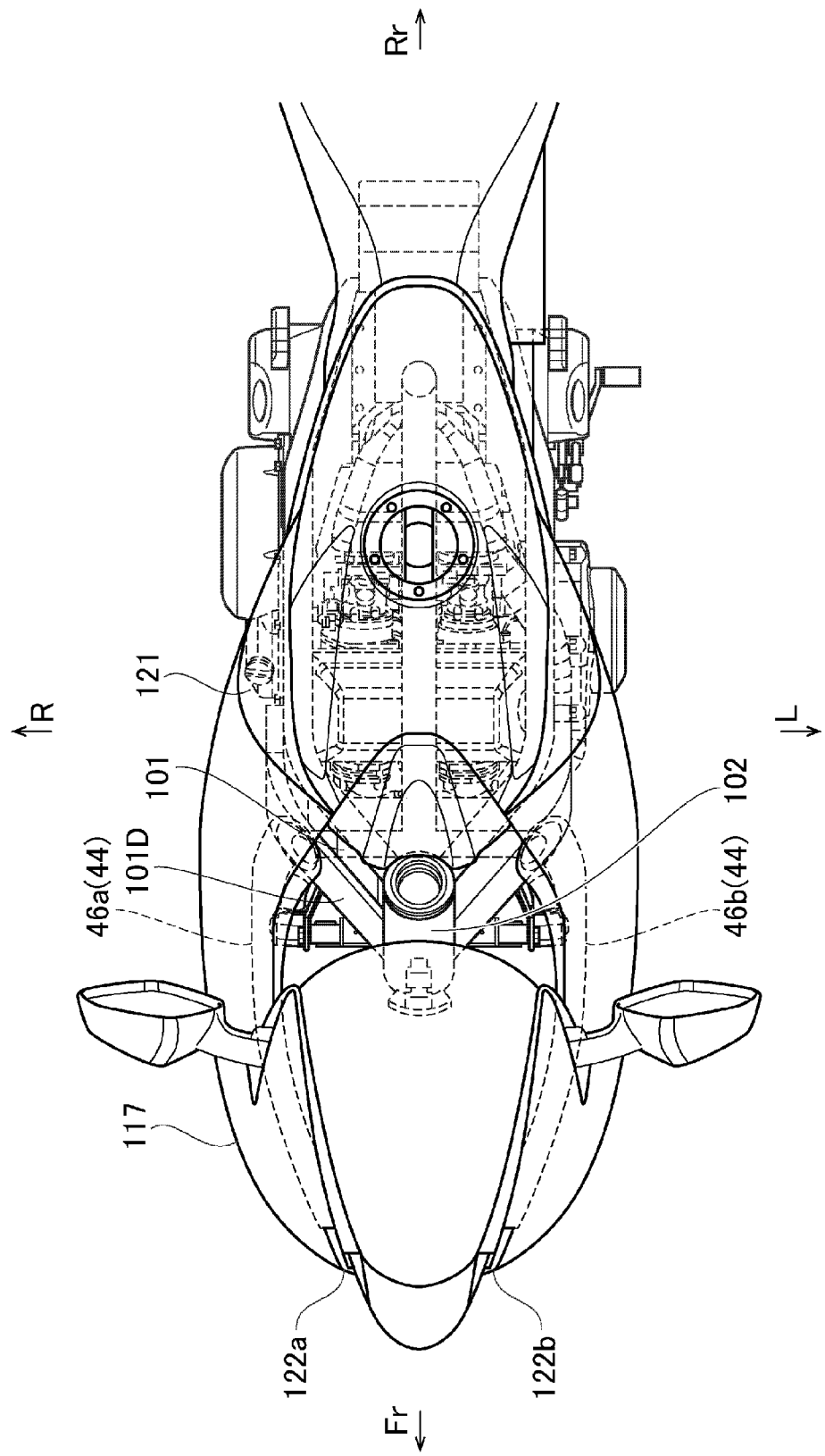
FIG. 16 is an upper surface view of the motorcycle according to the third embodiment of the present invention.

The inlet duct part 44 is formed by a left and right pair of inlet ducts 46a, 46b. As illustrated in FIG. 16, each of the inlet ducts 46a, 46b is disposed along an inner periphery of the half cowl 117 from a front part of the half cowl 117 toward a suspension plate part 101D. Front side openings of the inlet ducts 46a, 46b are communicated to inlet holes 122a, 122b formed at left and right both sides at a front end part of the half cowl where the traveling air becomes high-pressure. Besides, rear ends of the inlet ducts 46a, 46b are connected to the suspension plate part 101D under a state in which they are communicated to through holes 123a, 123b (refer to FIG. 17) formed at the suspension plate part 101D. Note that the rear ends of the inlet ducts 46a, 46b may be connected to the suspension plate part 101D by inserted into the through holes 123a, 123b.

Figure 17:
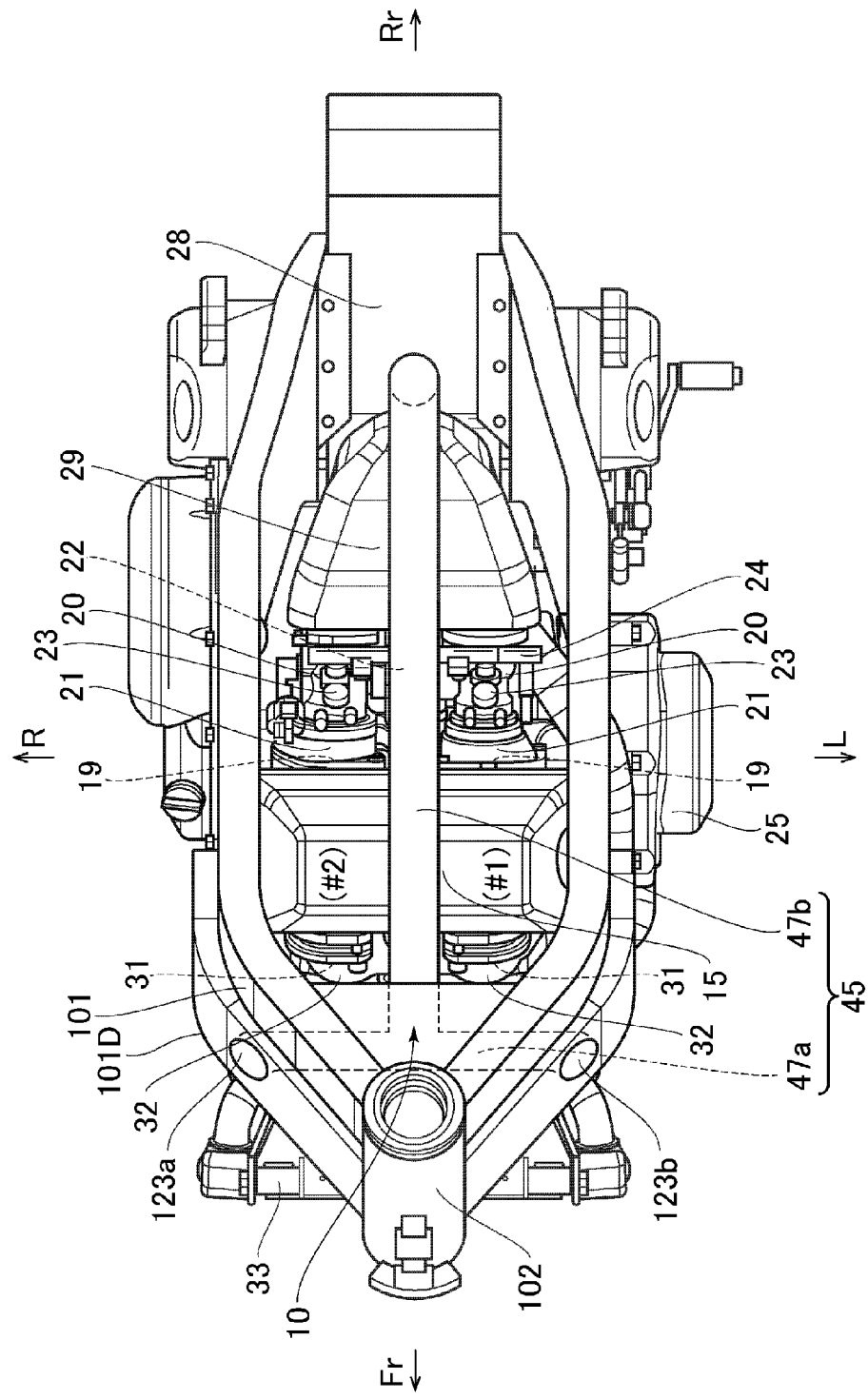
FIG. 17 is an upper surface view illustrating a configuration of a periphery of an engine unit according to the third embodiment of the present invention.

As illustrated in FIG. 17, the outlet duct part 45 is formed in approximately a T-shape when it is seen from an upper surface, and is formed by an upstream side outlet duct 47a and a downstream side outlet duct 47b. The upstream side outlet duct 47a is disposed in the vehicle body width direction at an inner side of the left and right pair of suspension plate parts 101C, and is connected to the suspension plate part 101D under a state communicated to the through hole 123a and the through hole 123b. Note that the upstream side outlet duct 47a may be inserted into the through hole 123a and the through hole 123b, to be thereby connected to the suspension plate part 101D.

Figure 15:
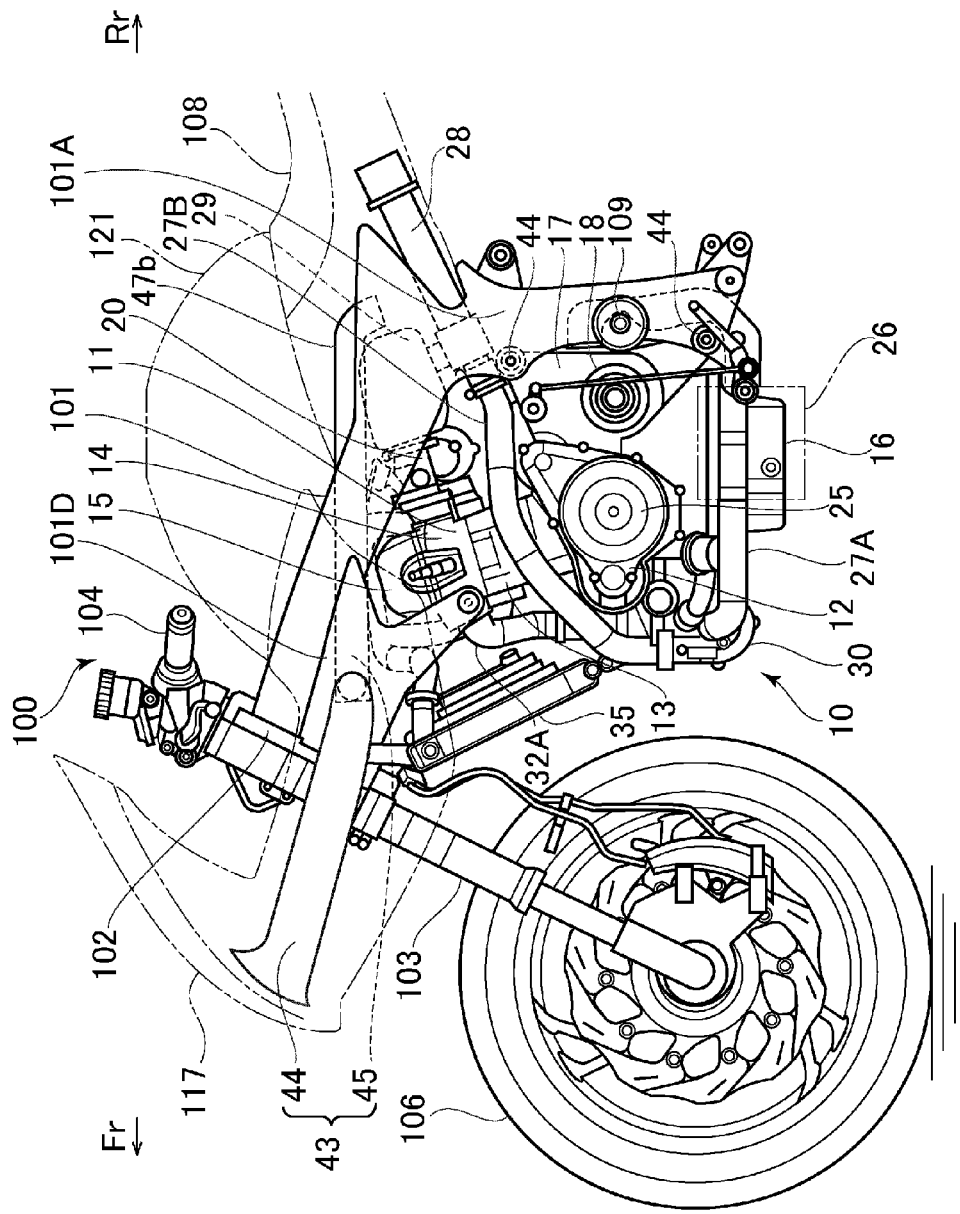
FIG. 15 is a left side view of a motorcycle in a state in which exterior parts are detached according to a third embodiment of the present invention.

The downstream side outlet duct 47b extends approximately horizontally from a center in the vehicle body width direction of the upstream side outlet duct 47a toward the vehicle body rear side, to reach the intercooler 28. As illustrated in FIG. 15, the downstream side outlet duct 47b reaches an upper side of the intercooler 28 by passing through a lower side of the fuel tank 121, an upper side of the cylinder head cover 15, and an upper side of the surge tank 29. A rear end of the downstream side outlet duct 47b is formed to bend toward the upper surface of the intercooler 28.

Accordingly, the traveling air flowed into the inlet ducts 46a, 46b of the inlet duct part 44 via the inlet holes 122a, 122b of the half cowl 117 is flowed out from the downstream side outlet duct 47b toward the intercooler 28 by passing through the upstream side outlet duct 47a. The traveling air cools the upper surface, side surfaces, and a lower surface of the intercooler 28 so as to surround the intercooler 28, and is discharged rearward of the vehicle body. Concretely, the traveling air is discharged to a space between the seat cowl 119 and the rear wheel 111, being a rear side of the pivot frame 101A, namely, toward the inner fender 116 illustrated in FIG. 1.

Here, basic operations and so on in the present invention are described. At first, the turbocharger 30 is included, and thereby, it is possible to simultaneously enable a substantial reduction in an exhaust rate and an improvement in intake efficiency of the engine 11. In this case, the air compressed by the supercharge 30 is cooled by the intercooler 28, and thereby, the deterioration of the intake efficiency is prevented, and the fuel efficiency improvement and the output power improvement are enabled.

Besides, the intercooler 28 and the surge tank 29 are disposed to overlap in the longitudinal direction, and thereby, both are to be adjacent, an air route between both is shortened, and a throttle response improves. Besides, pipes and so on are able to be reduced, and therefore, it leads to a reduction in weight and a reduction in the number of parts. Besides, the intercooler 28 is disposed at the rear side of the engine 11, and thereby, it is possible to simplify the layout at the front side of the engine 11 where the radiator 35, the exhaust pipe 32A, and the turbocharger 30 are disposed.

Besides, the turbocharger 30 is disposed at the front side of the intercooler 28, and thereby, the turbocharger 30 is disposed in the vicinity of the engine 11, and the intake system parts are integrated, and thereby, it is possible to shorten and simplify the pipes. Besides, weights of parts concentrate on the vehicle body center part, and therefore, operability of the vehicle improves. The turbocharger 30 is disposed at the front side of the engine 11 in adjacent to the exhaust pipe 32A extending from the front side of the cylinders 13, on the other hand, the intercooler 28 is disposed at the rear side, and thereby, the layout in front of the engine 11 is simplified.

Besides, the intercooler 28 is located between the vehicle body frame 101 to overlap with the vehicle body frame 101 when it is seen from the side surface, and thereby, it is possible to dispose the intercooler 28 at the further front side. Accordingly, it is possible to closely dispose the intercooler 28 to the engine unit 10, concentration of mass is enabled, and the operability and stability of the vehicle are improved. Besides, the intercooler 28 is disposed at the front side, and thereby, it is possible to set a position where the traveling air cooling the intercooler 28 is discharged at a nearest part to the rear side of the pivot frame 101A. The nearest part to the rear side of the pivot frame 101A becomes low-pressure (negative pressure) because it is covered from the front side by the pivot frame 101A as it is described later, and therefore, the traveling air cooling the intercooler 28 is sucked out, and it is possible to effectively cool the intercooler 28.

The intercooler 28 is located under the seat 108 and at least a part thereof is located more rearward than the front end of the seat 108. Therefore, since the intercooler 28 is disposed under (directly under or at the rear) of the seat 108, the traveling air in high-temperature which cooled the intercooler 28 does not easily hit against the passenger as compared with a case where the intercooler 28 is disposed in front of the seat 108, which improves comfortability of the passenger.

Besides, a detailed illustration is not given, but in the intercooler 28, a flow-in port and a flow-out port of the air are located at one side (a front half part of the vehicle body), and an internal air flow pass becomes approximately the U-shape. Accordingly, it has the constitution in which the flow pass of the air is folded in the intercooler 28, and thereby, it is possible to set the intercooler 28 wider for the extent of the occupied space of the conventional U-shape pipe compared to the case when the fold type U-shape pipe is provided. It is thereby possible to maximally make use of a limited room or a space at the lower side of the seat 108, and therefore, cooling efficiency improves, and the number of parts can be reduced.

Next, the above-stated vehicle body frame 101 is further described with reference to FIG. 10 to FIG. 12, and so on. The pivot frame 101A is bent from the rear end of the vehicle body frame 101, and formed to extend downward. The pivot frame 101A includes the above-stated front wall 101B and rear wall 101C, a left and right pair of sidewalls 101E, and an upper wall 101F, and is formed into a piece of hollow state extending in the longitudinal direction.

Figure 18:
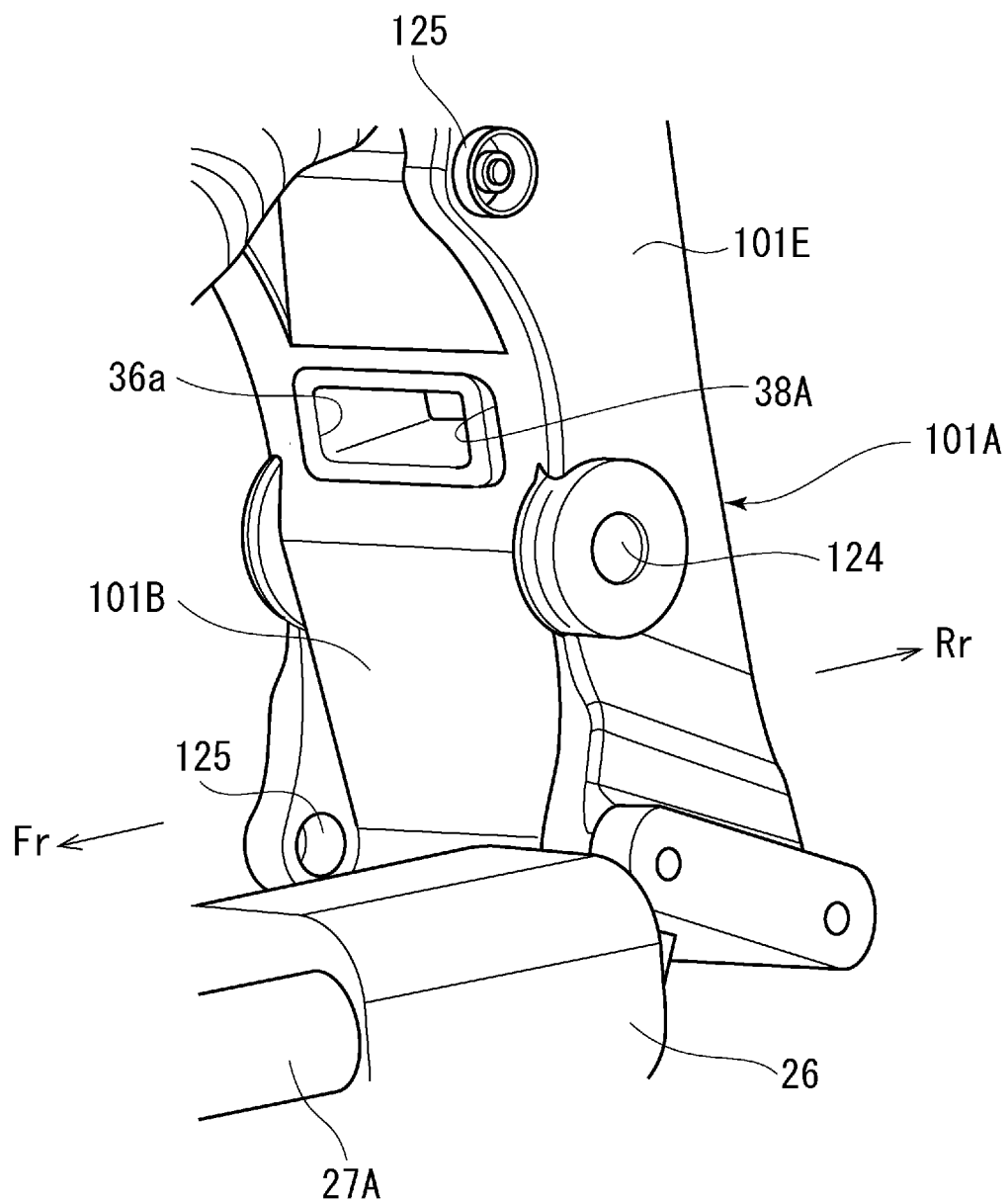
FIG. 18 is a front side perspective view of a pivot frame according to the third embodiment of the present invention.

As illustrated in FIG. 11, an insertion hole 124 is formed at approximately a center in the longitudinal direction of each of the sidewalls 101E, and the pivot shaft 109 is inserted into the insertion holes 124 in the vehicle body width direction. Note that as illustrated in FIG. 10, the pivot shaft 109 is supported by pivot supporting parts 101G respectively coupled to lower ends of the sidewalls 101E, and disposed at outside apart from the sidewalls 101E. Besides, engine suspension parts 125 are formed at upper and lower parts of the sidewalls 101E while being protruded frontward than the front wall 101B (refer to FIG. 18).

As illustrated in FIG. 12, the rear wall 101C joins the sidewalls 101E with each other with a predetermined interval at a front side from rear ends of the sidewalls 101E. The rear wall 101C is formed from upper ends to the lower ends of the sidewalls 101E with no space between. Accordingly, a nearest part at the rear side of the pivot frame 101A is completely covered by the rear wall 101C from the front side, and therefore, it becomes low-pressure at a driving time. Besides, connection parts 126 protruding rearward and connecting the link mechanism 113 (FIG. 1) are formed at a lower part of the rear wall 101C.

The front wall 101B joins front ends of the sidewalls 101E with each other with a predetermined interval. At the front wall 101B, the moderate void 39 is formed between the rear surface 17a of the transmission case 17. The opening 38A being a rectangular first opening is formed at the front wall 101B at a position higher than the pivot shaft 109. An intake port 36a of the intake passage 36 is inserted into the opening 38A.

As illustrated in FIG. 11, the upper wall 101F joins the sidewalls 101E, an upper end of the front wall 101B, and an upper end of the rear wall 101C with each other so as to cover a space formed by the front wall 101B, the rear wall 101C, and the sidewalls 101E from an upper side. The upper wall 101F is formed to incline upward as it goes rearward. An inclination angle of the upper wall 101F and an inclination angle of the intercooler 28 are the same or approximately the same, and the upper wall 101F and the front end of the intercooler 28 face. In the present embodiment, the upper wall 101F and the intercooler 28 are in contact, and the upper wall 101F supports the intercooler 28 from a lower side. An opening 38B being a rectangular second opening is formed at approximately a center in a horizontal direction at a lower end of a space formed by the front wall 101B, the rear wall 101C, and the sidewalls 101E, and an intake duct of the intake passage 36 is inserted into the opening 38B.

The intake duct making up the intake passage 36 is disposed at a hollow inner side of the pivot frame 101A. As illustrated in FIG. 9 and FIG. 11, the intake passage 36 includes an extending part 36A which approximately horizontally extends rearward from the flow-in port 26a of the air cleaner 26, and a bending part 36B which bend from a rear end of the extending part 36A and extends upward.

As illustrated in FIG. 6 and FIG. 9, the extending part 36A extends from the air cleaner 26 which is disposed while being deviated toward the left side in the vehicle body width direction toward a diagonally rearward right, and reaches a lower side of the pivot frame 101A, namely, a center in the vehicle width direction.

An upper end of the bending part 36B is bent frontward, and the intake port 36a to take in the air is formed at a tip thereof. The intake port 36a is disposed to face the engine 11, specifically, to face the rear surface 17a of the transmission case 17. Besides, a recessed part 36C (FIG. 11) to avoid an interference with the pivot shaft 109 is formed at a front surface of the bending part 36B.

As illustrated in FIG. 11 and FIG. 12, under a state in which the intake passage 36 is disposed at the hollow inner side of the pivot frame 101A, the bent tip of the bending part 36B is inserted into the opening 38A of the front wall 101B of the pivot frame 101A, and the intake port 36a positions at the void 39. Besides, a lower side of the bending part 36B is inserted into the opening 38B of the pivot frame 101A, and connected to the extending part 36A.

As stated above, the pivot frame 101A is made up of one piece which is rectangular in cross section by the front wall 101B, the rear wall 101C, and the sidewalls 101E, and therefore, it is possible to improve the vehicle body stiffness compared to only a left and right pair of frames. Besides, the pivot frame 101A is made up of one piece to improve the vehicle body stiffness, and thereby, it is possible to make each thickness of the front wall 101B, the rear wall 101C, and the sidewalls 101E thin. Therefore, it is possible to enable the reduction in weight of the vehicle body compared to a frame formed to be thick by only a left and right pair of frames.

Besides, the intake passage 36 is disposed in the pivot frame 101A, and thereby, it is possible to effectively make use of the hollow inner side of the pivot frame 101A. In particular, an inside of the pivot frame 101A is formed to be comparatively wide, and therefore, it is possible to freely design the intake passage 36 such that a distance from the intake port 36a to the air cleaner 26 becomes an appropriate length. Besides, the pivot frame 101A surrounds the bending part 36B of the intake passage 36, and therefore, it is possible to reduce an intake noise generated from the intake passage 36, and to prevent a damage caused by scattering stones and so on. Further, the bending part 36B of the intake passage 36 is supported by the opening 38A being the first opening and the opening 38B being the second opening formed at the pivot frame 101A, and thereby, it is not necessary to support by using an additional bracket member and so on. Therefore, it is possible to enable the reduction in the number of parts, and the reduction in weight.

Besides, the intake port 36a of the intake passage 36 is disposed at a position higher than the pivot shaft 109, and therefore, it is possible to suppress mixing of foreign matters such as water and mud. Accordingly, it is possible to prevent that moisture and so on is induced into the air cleaner 26 even though the air cleaner 26 is disposed at a low part.

Besides, the intake port 36a of the intake passage 36 faces the engine 11, specifically the rear surface 17a of the transmission case 17, and disposed in the void 39, and therefore, it takes in the air via the void 39. Accordingly, it is possible to suppress the mixing of the foreign matters from the intake port 36a.

Note that the vehicle body frame 101 including the above-stated pivot frame 101A is able to be manufactured by, for example, casting of aluminum diecast. In this case, it is casted by using a core which corresponds to a shape of the hollow inner side of the pivot frame 101A. At this time, the core is supported via the opening 38A which is formed at approximately the center in the longitudinal direction of the pivot frame 101A, and thereby, it is possible to easily manufacture the pivot frame 101A.

Hereinabove, the present invention is described with various embodiments, but the present invention is not limited only to the above-described embodiments, and various modifications and so on can be embodied within the scope of the present invention.

In the above-stated embodiments, the example in which the intake port 36a of the intake passage 36 is opened to the void 39 at a rear surface of the engine (concretely, the transmission case 17) is described, but it may be opened in the cylindrical part 37. It is opened at an internal area surrounded by the pivot frame 101A, and thereby, it is possible to suppress the mixing of the foreign matters such as water and mud also in this case.

Besides, in the above-described embodiments, the case when the surge tank 29 which temporarily stores the cooled air from the intercooler 28 is included is described, but the surge tank 29 may not be provided. When the surge tank 29 is not provided, it is possible to apply a constitution in which the air is directly supplied from the intercooler 28 to the throttle bodies 20.

Besides, in the above-described embodiments, the example of the water-cooled parallel two-cylinder engine is described, but the number of cylinders, the cooling system, and so on of the engine 11 can be selected appropriately, and for example, it is applicable for an air-cooled engine with three cylinders or more.

According to the present invention, an air cleaner and a turbocharger are intensively disposed in the vicinity of a lower part of an engine, which enables a length of an air intake pipe connecting between both to be short, and enables a simple piping. An intake passage which is connected to the air cleaner extends rearward from a rear part of the air cleaner, then bends upward, and an intake port is provided at a high position. As a result, it is possible to suppress mixing of foreign matters such as water and mud.

Besides, according to the present invention, at least a part of control parts is disposed to overlap with any of a turbocharger, or an air intake pipe and an air outlet pipe when it is seen from a vehicle body front surface. A front part of the control parts which is small-sized and weak for shock, stain, and so on is covered by the turbocharger, or pipes and so on connected thereto, and thereby, it is possible to effectively protect from scattering stones and so on at a driving time, and to improve parts durability.

Further, according to the present invention, the vehicle body frame includes a piece of hollow state pivot frame which is bent from the rear end of the body frame part and extends downward toward the pivot shaft, and thereby, it is possible to improve stiffness of the vehicle body frame. Besides, the pivot frame is a piece of hollow state, and therefore, it is possible to form into a thin part, so it is possible to reduce in weight of the vehicle body frame.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A motorcycle with turbocharger, comprising:
an engine in which an exhaust pipe is connected to a front side of a cylinder head, and throttle bodies are connected to a rear side of the cylinder head;
an air cleaner which filtrates fuel air;
a turbocharger which compresses intake fuel air;
an air intake pipe which connects the air cleaner and the turbocharger; and
an intake passage which induces the fuel air taken from an intake port at an end part to the air cleaner,
wherein the turbocharger is located at a front side lower part of the engine, and the air cleaner is located under a crankcase.

2. The motorcycle with turbocharger according to claim 1, wherein the intake passage extends rearward from a rear part of the air cleaner, and thereafter, bends upward.

3. The motorcycle with turbocharger according to claim 2, wherein the intake passage bends forward after it bends upward, and is provided in a mode in which the intake port faces forward.

4. The motorcycle with turbocharger according to claim 2, wherein the intake port is located at a rear of the engine, and is provided to overlap with the engine when it is seen from a vehicle body front surface.

5. The motorcycle with turbocharger according to claim 2, wherein a pivot frame at a vehicle body frame lower portion is in a cylindrical state which extends upward and downward and is hollow inside, includes a lower side opening, and the intake passage is inserted into the lower side opening such that at least a part thereof is located at an inner side of the cylindrical part of the pivot frame.

6. The motorcycle with turbocharger according to claim 5, wherein the pivot frame includes an upper side opening at upside of the lower side opening, and the intake passage is provided such that the intake port exposes from the upper side opening.

7. The motorcycle with turbocharger according to claim 5, wherein the intake passage is inserted into the pivot frame such that the intake port is located at the inner side of the cylindrical part of the pivot frame.

8. The motorcycle with turbocharger according to claim 1, further comprising:
an air outlet pipe which is connected to a downstream side of the turbocharger; and
one or more control parts which control opening/closing of an intake or exhaust passage in accordance with a state in the intake or exhaust passage,
wherein the control parts are located at a rear of the turbocharger, and at least a part thereof overlaps with the turbocharger, or either of the air intake pipe or the air outlet pipe when it is seen from the vehicle body front surface.

9. The motorcycle with turbocharger according to claim 8, wherein outer ends of the control parts are located at a vehicle body inner side than an outer end of either of the air intake pipe or the air outlet pipe when it is seen from the vehicle body front surface.

10. The motorcycle with turbocharger according to claim 8, further comprising:
a waste gate valve which is connected to an intermediate part of the exhaust pipe to adjust an internal pressure thereof as a predetermined control part,
wherein at least a part of the waste gate valve is provided to overlap with the turbocharger, or the exhaust pipe or the air outlet pipe when it is seen from the vehicle body front surface.

11. The motorcycle with turbocharger according to claim 8, further comprising:
an air bypass valve which bypasses the turbocharger via an air bypass hose, and connects the air intake pipe and the air outlet pipe as the predetermined control part, wherein one end of the air bypass hose is connected to the air bypass valve, and the other end is connected to the air intake pipe or the air outlet pipe, and at least a part of the air bypass valve is provided to overlap with any of the turbocharger, the air intake pipe, and the air bypass hose when it is seen from the vehicle body front surface.

12. The motorcycle with turbocharger according to claim 11, wherein at least a part of the air bypass valve is provided to overlap with the air intake pipe when it is seen from a vehicle body side surface.

13. The motorcycle with turbocharger according to claim 8, wherein the turbocharger includes flow paths where intake air and exhaust air respectively flow at an inside thereof, and a compressor part which compresses the intake air by an exhaust stream, and the control parts are located in a mode in which at least a part thereof overlaps with the compressor part of the turbocharger when it is seen from the vehicle body front surface.

14. The motorcycle with turbocharger according to claim 1, wherein the engine is supported by a vehicle body frame, and the motorcycle with turbocharger further comprising:

an intercooler which cools the fuel air compressed by the turbocharger and supplies to the throttle bodies, wherein the vehicle body frame includes:

a left and right pair of body frames which extends rearward and downward of a vehicle body from a steering head pipe; and a piece of hollow pivot frame which is bent from a rear end of the body frame and extends downward toward a pivot shaft.

15. The motorcycle with turbocharger according to claim 14, wherein the intercooler is disposed to be inclined at a position at a rear side of the throttle bodies, between the left and right pair of body frames, and facing an upper wall of the pivot frame.

16. The motorcycle with turbocharger according to claim 14, further comprising:

a surge tank which temporarily stores the fuel air cooled by the intercooler and supplies to the throttle bodies, wherein a part of the surge tank is disposed between the left and right pair of body frames to overlap with the intercooler in a longitudinal direction.

17. The motorcycle with turbocharger according to claim 14, wherein the turbocharger is supplied with the fuel air from an intake port of an intake duct disposed at a rear side of the engine via the air cleaner, the intake duct is disposed at a hollow inner side of the pivot frame, a first opening to locate the intake port to face the engine is formed at a front wall of the pivot frame, and a second opening to insert the intake duct and to connect to the air cleaner is formed at a lower end of the pivot frame.

18. The motorcycle with turbocharger according to claim 14, wherein the vehicle body frame includes a left and right pair of suspension plate parts which is joined to lower ends of the left and right pair of body frames, and suspends the engine, and through holes where a duct hose part which guides traveling air to cool the intercooler is inserted or connected are formed at the left and right pair of suspension plate parts.

* * * * *